(12) United States Patent
Chen et al.

(10) Patent No.: US 11,689,646 B2
(45) Date of Patent: *Jun. 27, 2023

(54) NETWORK PACKET PROCESSING METHOD AND APPARATUS AND NETWORK SERVER

(71) Applicant: HUAWEI TECHNOLOGIES CO., LTD., Guangdong (CN)

(72) Inventors: Rujie Chen, Shenzhen (CN); Kai Zheng, Beijing (CN); Maoqing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,940

(22) Filed: Nov. 30, 2021

(65) Prior Publication Data

US 2022/0086262 A1 Mar. 17, 2022

Related U.S. Application Data

(63) Continuation of application No. 16/260,656, filed on Jan. 29, 2019, now Pat. No. 11,218,570, which is a
(Continued)

(30) Foreign Application Priority Data

Jul. 30, 2016 (CN) .......................... 201610619837.3

(51) Int. Cl.
*H04L 69/163* (2022.01)
*H04L 69/16* (2022.01)
(Continued)

(52) U.S. Cl.
CPC ........ *H04L 69/163* (2013.01); *H04L 43/0811* (2013.01); *H04L 45/745* (2013.01);
(Continued)

(58) Field of Classification Search
CPC ... H04L 43/0811; H04L 45/745; H04L 67/12; H04L 67/14; H04L 67/141; H04L 67/142;
(Continued)

(56) References Cited

U.S. PATENT DOCUMENTS

2004/0015591 A1 1/2004 Wang
2004/0098720 A1 5/2004 Hooper
(Continued)

FOREIGN PATENT DOCUMENTS

CN 101547210 9/2009
CN 101656737 2/2010
(Continued)

OTHER PUBLICATIONS

Extended European Search Report issued in Application No. 17836172. 1, dated Jun. 18, 2019, 9 pages.
(Continued)

*Primary Examiner* — Thomas J Dailey
(74) *Attorney, Agent, or Firm* — Fish & Richardson P.C.

(57) ABSTRACT

The application discloses a network packet processing method and a network server. The method discloses that a network apparatus receives a first TCP packet sent by a client, where the first TCP packet includes a first quintuple and then the network apparatus determines a first thread that processes the first TCP packet according to the first quintuple and processes the first TCP packet by using the first thread.

20 Claims, 11 Drawing Sheets

Related U.S. Application Data continuation of application No. PCT/CN2017/078588, filed on Mar. 29, 2017.

(51) Int. Cl.
| | | |
|---|---|---|
| *H04L 67/141* | (2022.01) | |
| *H04L 67/142* | (2022.01) | |
| *H04L 67/146* | (2022.01) | |
| *H04L 67/143* | (2022.01) | |
| *H04L 67/14* | (2022.01) | |
| *H04L 43/0811* | (2022.01) | |
| *H04L 45/745* | (2022.01) | |
| *H04L 67/12* | (2022.01) | |

(52) U.S. Cl.
CPC ............ *H04L 67/14* (2013.01); *H04L 67/141* (2013.01); *H04L 67/142* (2013.01); *H04L 67/143* (2013.01); *H04L 67/146* (2013.01); *H04L 69/162* (2013.01); *H04L 67/12* (2013.01)

(58) Field of Classification Search
CPC ... H04L 67/143; H04L 67/146; H04L 69/162; H04L 69/163
See application file for complete search history.

(56) References Cited

U.S. PATENT DOCUMENTS

| | | |
|---|---|---|
| 2005/0226238 A1 | 10/2005 | Hoskote et al. |
| 2006/0047839 A1 | 3/2006 | Tate et al. |
| 2006/0126628 A1 | 6/2006 | Li et al. |
| 2008/0126539 A1 | 5/2008 | Banerjee et al. |
| 2010/0161783 A1 | 6/2010 | Komine |
| 2014/0101758 A1 | 4/2014 | Ludin et al. |
| 2015/0003467 A1 | 1/2015 | Biswas |
| 2016/0036879 A1 | 2/2016 | Vadura et al. |
| 2016/0050236 A1 | 2/2016 | Goto et al. |
| 2016/0077857 A1 | 3/2016 | Dong et al. |
| 2016/0246538 A1 | 8/2016 | Vazhenin |

FOREIGN PATENT DOCUMENTS

| | | |
|---|---|---|
| CN | 101895529 | 11/2010 |
| CN | 102647358 | 8/2012 |
| CN | 102710497 | 10/2012 |
| CN | 102916953 | 2/2013 |
| CN | 103530172 | 1/2014 |
| CN | 103873474 | 6/2014 |
| CN | 104519019 | 4/2015 |
| CN | 105743812 | 7/2016 |
| CN | 106657134 | 5/2017 |
| EP | 2323344 | 5/2011 |
| GN | 101355577 A | 1/2009 |

OTHER PUBLICATIONS

International Search Report, dated Jun. 26, 20 17, in International Application No. PCT/CN2017/078588, 4 pages.
Office Action issued in Chinese Application No. 201610619837.3 dated Feb. 3, 2021, 5 pages.
Office action issued in Chinese Application No. 201610619837.3 dated Jan. 19, 2020, 32 pages (With English Translation).
Written Opinion of the International Searching Authority, dated Jun. 26, 2017, in International Application No. PCT/CN2017/078588, 7 pages.
Office Action issued in Chinese Application No. 202110416549.9 dated Mar. 7, 2022, 11 pages (with English translation).

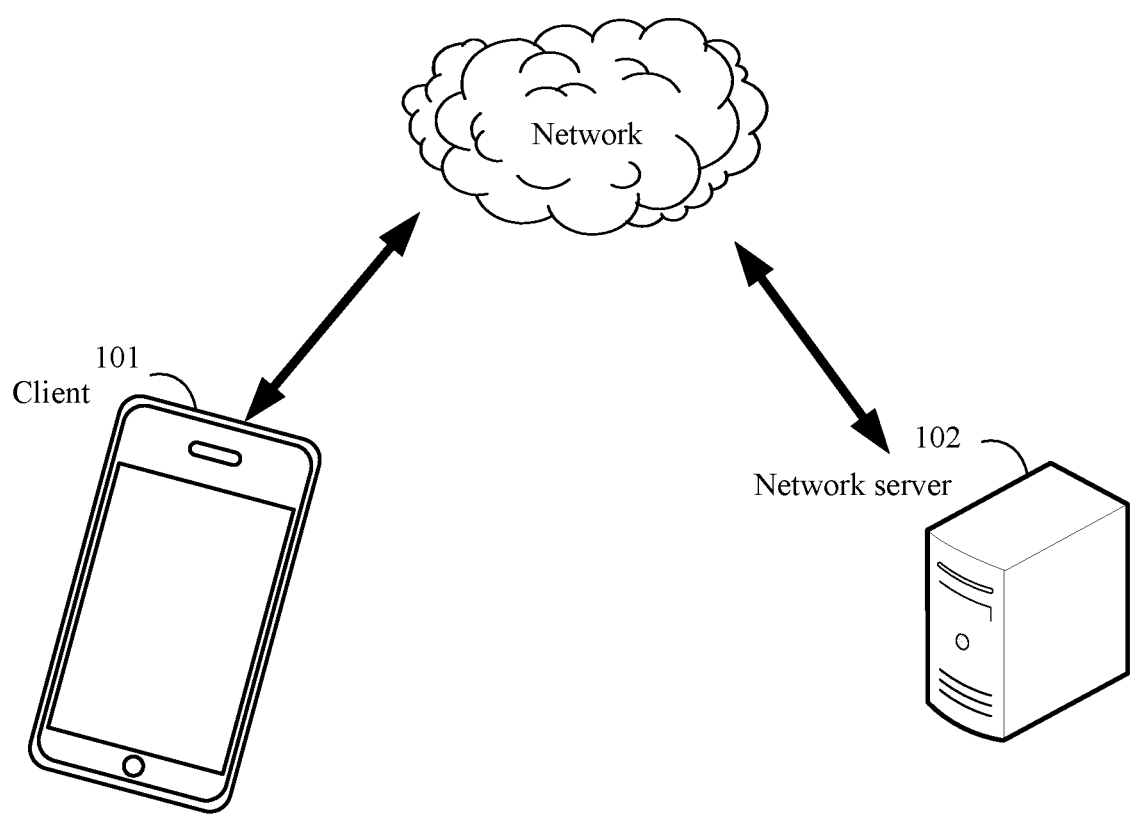
FIG. 1.1

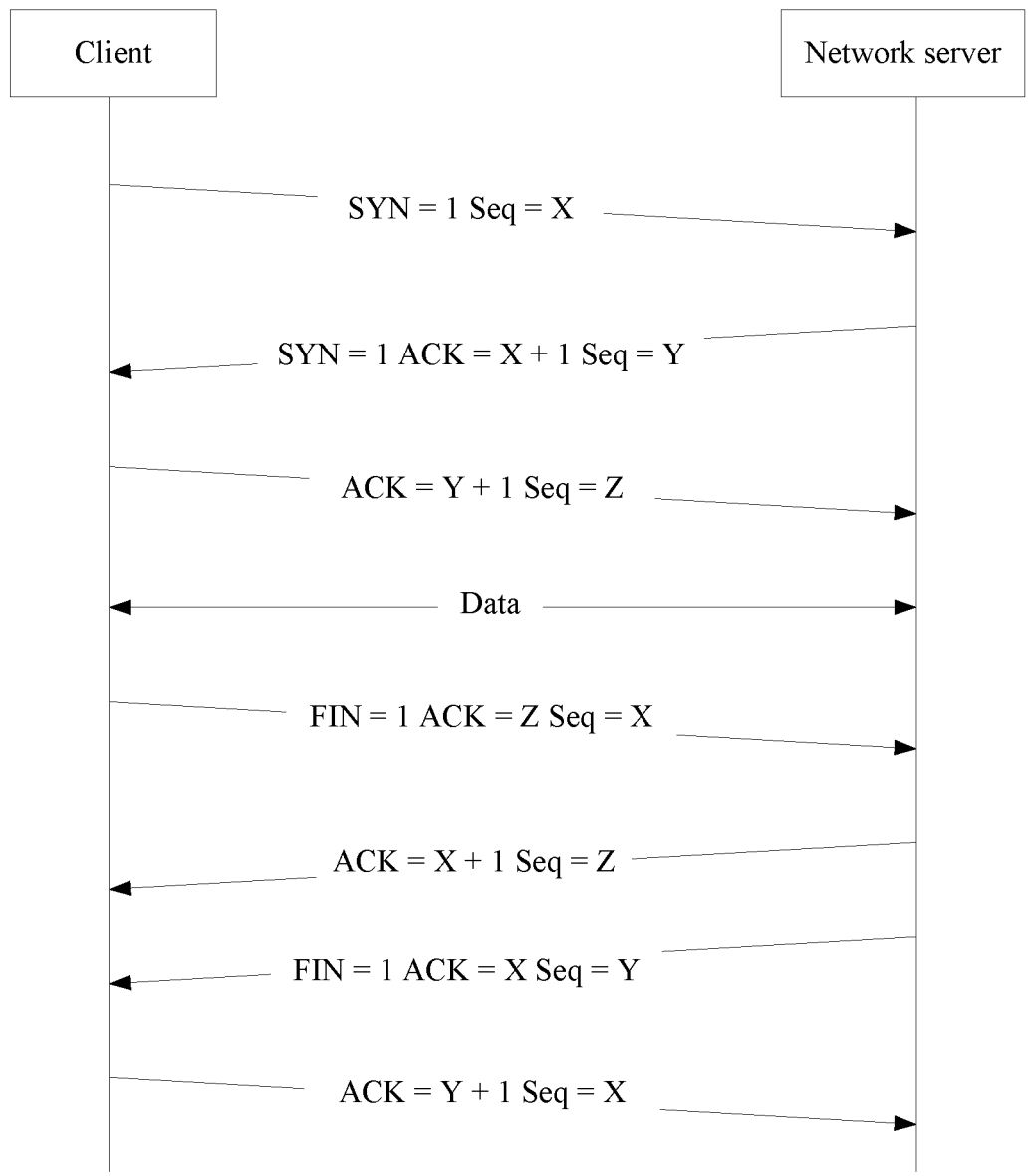
FIG. 1.2

NETWORK PACKET PROCESSING METHOD AND APPARATUS AND NETWORK SERVER

CROSS-REFERENCE TO RELATED APPLICATIONS

This application is a continuation of U.S. patent application Ser. No. 16/260,656, filed on Jan. 29, 2019, which is a continuation of International Application No. PCT/CN2017/078588, filed on Mar. 29, 2017. The International Application claims priority to Chinese Patent Application No. 201610619837.3, filed on Jul. 30, 2016. All of the aforementioned patent applications are hereby incorporated by reference in their entireties.

TECHNICAL FIELD

The present invention relates to the field of intelligent terminal technologies, and in particular, to a network packet processing method and apparatus, and a network server.

BACKGROUND

The Transmission Control Protocol (TCP) is a connection-oriented transport layer communications protocol. A main operation procedure of a TCP connection is as follows: An end-to-end connection is first established by means of a three-way handshake, then data transmission is performed, and after communication is complete, the connection is disconnected by using a four-way handshake. A TCP connection in an establishment process or a disconnection process is referred to as an unsteady TCP connection, and a TCP connection in a data transmission process is referred to as a steady TCP connection. In addition, the TCPHIA defines six message types: URG, ACK, PSH, RST, SNY, and FIN. The six messages make it possible for each TCP connection to transit between different statuses.

With rapid development of the mobile Internet and the Internet of Things, a large quantity of handheld terminals and Internet of Things devices access the Internet. A TCP module or a TCP processing process on a server end usually needs to process massive TCP connections, and a status of each TCP connection changes dynamically. Therefore, how to effectively process a TCP connection on a server end is a challenging subject.

SUMMARY

Embodiments of the present invention provide a network packet processing method and apparatus, and a network server, so that adaptive processing may be performed on a network packet according to a status of a TCP connection, so as to improve TCP connection processing efficiency of a network server.

According to a first aspect, an embodiment of the present invention discloses a network packet processing method, including:

receiving a first Transmission Control Protocol TCP packet sent by a client, where the first TCP packet includes a first quintuple; determining, according to the first quintuple, a first thread that processes the first TCP packet, where the first quintuple is used to identify a TCP connection corresponding to the first TCP packet, a TCP connection status of the TCP connection is an unsteady TCP connection or a steady TCP connection, the unsteady TCP connection represents a TCP connection in an establishment process or a disconnection process, the steady TCP connection represents a TCP connection in a data transmission process, the first thread is a control thread or a data processing thread, the control thread is used to process the unsteady TCP connection, and the data processing thread is used to process the steady TCP connection; and processing the first TCP packet by using the first thread.

The first TCP packet may be a handshake packet that is used to establish a TCP connection, or a handshake packet or a data packet that is used to disconnect a TCP connection. The first quintuple is a quintuple carried in the first TCP packet, and may be used to identify a TCP connection corresponding to the first TCP packet. The first quintuple includes a source address, a source port, a destination address, a destination port, and a transmission type that are in the first TCP packet, where the transmission type may be a TCP type.

It can be learned that after the network server receives the first TCP packet, the network server may determine, according to the first quintuple, the first thread that processes the first TCP packet. If the first thread is the control thread, the network server may process the first TCP packet by using the control thread; or if the first thread is the data processing thread, the network server may process the first TCP packet by using the data processing thread. Therefore, adaptive processing may be performed on a network packet according to the status of the TCP connection.

It should be noted that for each TCP connection, the network server may process a TCP packet of the TCP connection according to the foregoing steps. When there are a large quantity of TCP connections, the network server performs adaptive processing on the network packet according to the status of the TCP connection, so that the unsteady TCP connection and the steady TCP connection do not affect each other. In addition, the network server may process in parallel a TCP packet of the unsteady TCP connection and a TCP packet of the steady TCP connection, so as to improve TCP connection processing efficiency of the network server.

In a possible implementation, the determining, according to the first quintuple, a first thread that processes the first TCP packet includes:

determining, according to a current mapping relationship between the first quintuple and a thread, a first thread corresponding to the first quintuple under the current mapping relationship, where a mapping relationship between the first quintuple and the thread changes when the TCP connection status of the TCP connection changes.

Optionally, in another possible implementation, the determining, according to the first quintuple, a first thread that processes the first TCP packet includes: determining, according to the first quintuple, a TCP connection corresponding to the first TCP packet, so as to determine a status of the corresponding TCP connection and determine, according to the status of the TCP connection, the first thread that processes the first TCP packet. Specifically, when the corresponding TCP connection is the steady TCP connection, the first thread is the data processing thread; or when the corresponding TCP connection is the unsteady TCP connection, the first thread is the control thread.

In a possible implementation, the first thread is the control thread, and after the processing the first TCP packet by using the first thread, the TCP connection status of the TCP connection changes from the unsteady TCP connection to the steady TCP connection, and the method further includes:

deleting a mapping relationship between the first quintuple and the first thread; and re-establishing a mapping relationship between the first quintuple and a thread, so that a thread corresponding to the first quintuple changes to a second thread, where the second thread is a data processing thread.

A mapping relationship between a first quintuple and a control thread represents that the TCP connection status of the TCP connection is the unsteady TCP connection. After the network server processes the first TCP packet by using the control thread, the TCP connection status of the TCP connection changes from the unsteady TCP connection to the steady TCP connection, that is, the TCP connection status of the TCP connection changes. In this case, the mapping relationship between a first quintuple and a control thread is no longer applicable, and the network server needs to delete the mapping relationship between a first quintuple and a control thread, and re-establish the mapping relationship between the first quintuple and a thread, so that the thread corresponding to the first quintuple changes to the data processing thread, and a new TCP connection may be quickly established.

In a possible implementation, the method further includes:

receiving a second TCP packet sent by the client, where the second TCP packet includes the first quintuple; determining, according to the re-established mapping relationship between the first quintuple and a thread, the thread corresponding to the first quintuple as the second thread; and processing the second TCP packet by using the second thread.

The re-established mapping relationship between the first quintuple and a thread may be understood as a current mapping relationship between the first quintuple and a thread when the second TCP packet sent by the client is received. Each time the TCP packet sent by the client is received, the network server needs to determine a to-be-used thread according to the current mapping relationship between a quintuple and a thread.

In a possible implementation, the first thread is the data processing thread, and after the processing the first TCP packet by using the first thread, the TCP connection status changes from the steady TCP connection to the unsteady TCP connection, and the method further includes:

deleting a mapping relationship between the first quintuple and the first thread; and re-establishing a mapping relationship between the first quintuple and a thread, so that a thread corresponding to the first quintuple changes to a third thread, where the third thread is a control thread.

A mapping relationship between a first quintuple and a data processing thread represents that the TCP connection status of the TCP connection is the steady TCP connection. After the network server processes the first TCP packet by using the data processing thread, the TCP connection status of the TCP connection changes from the steady TCP connection to the unsteady TCP connection, that is, the TCP connection status of the TCP connection changes. In this case, the mapping relationship between a first quintuple and a data processing thread is no longer applicable, and the network server needs to delete the mapping relationship between a first quintuple and a data processing thread, and re-establish the mapping relationship between the first quintuple and a thread, so that the thread corresponding to the first quintuple changes to the control thread, and a TCP connection that needs to be disconnected can be efficiently released.

In a possible implementation, the method further includes:

receiving a third TCP packet sent by the client, where the third TCP packet includes the first quintuple; determining, according to the re-established mapping relationship between the first quintuple and a thread, the thread corresponding to the first quintuple as the third thread; and processing the third TCP packet by using the third thread.

The re-established mapping relationship between the first quintuple and a thread may be understood as a current mapping relationship between the first quintuple and a thread when the third TCP packet sent by the client is received. Each time the TCP packet sent by the client is received, the network server needs to determine a to-be-used thread according to the current mapping relationship between a quintuple and a thread.

In a possible implementation, the control thread is a pre-control thread or a post-control thread, the pre-control thread is used to process an establishment process of the TCP connection in an unsteady TCP connection state, and the post-control thread is used to process a disconnection process of the TCP connection in an unsteady TCP connection state.

According to a second aspect, an embodiment of the present invention discloses a network packet processing method, including:

obtaining a TCP connection close request from an application program APP, where the TCP connection close request includes a target socket identifier, and the TCP connection close request is used to request to disconnect a TCP connection identified by the target socket identifier; determining, according to the target socket identifier, a first thread that processes the TCP connection close request, where a TCP connection status of the TCP connection is an unsteady TCP connection or a steady TCP connection, the unsteady TCP connection represents a TCP connection in an establishment process or a disconnection process, the steady TCP connection represents a TCP connection in a data transmission process, the first thread is a data processing thread, and the data processing thread is used to process the steady TCP connection; and processing the TCP connection close request by using the first thread.

When the TCP connection needs to be closed, the network server may be triggered by the application program APP to generate the TCP connection close request. When the network server obtains the TCP connection close request from the APP, a current mapping relationship between a target socket identifier carried in the TCP connection close request and a thread is a mapping relationship between a target socket identifier and a data processing thread. The network server may process the TCP connection close request by using the data processing thread.

In a possible implementation, the determining, according to the target socket identifier, a first thread that processes the TCP connection close request includes:

determining, according to a current mapping relationship between the target socket identifier and a thread, a first thread corresponding to the target socket identifier under the current mapping relationship, where a mapping relationship between the target socket identifier and the thread changes when the TCP connection status of the TCP connection identified by the target socket identifier changes.

Optionally, in another possible implementation, the determining, according to the target socket identifier, a first thread that processes the TCP connection close request includes:

determining a corresponding TCP connection that is identified by the target socket identifier, so as to determine a status of the corresponding TCP connection and determine, according to the status of the TCP connection, the first thread that processes the TCP connection close request.

In a possible implementation, after the processing the TCP connection close request by using the first thread, the TCP connection status of the TCP connection changes from the steady TCP connection to the unsteady TCP connection, and the method further includes:

deleting a mapping relationship between the target socket identifier and the first thread.

The mapping relationship between a target socket identifier and a data processing thread represents that the TCP connection status of the TCP connection is the steady TCP connection. After the network server processes the TCP connection close request by using the data processing thread, the TCP connection status of the TCP connection changes from the steady TCP connection to the unsteady TCP connection, that is, the TCP connection status of the TCP connection changes. In this case, the mapping relationship between a target socket identifier and a data processing thread is no longer applicable, and the network server needs to delete the mapping relationship between a target socket identifier and a data processing thread.

According to a third aspect, an embodiment of the present invention discloses a network packet processing apparatus, and the network packet processing apparatus includes a function unit that is configured to perform some or all steps of any method in the first aspect according to the embodiments of the present invention. When performing some or all steps of any method in the first aspect, the network packet processing apparatus may flexibly process a network packet according to different scenarios.

According to a fourth aspect, an embodiment of the present invention discloses a network packet processing apparatus, and the network packet processing apparatus includes a function unit that is configured to perform some or all steps of any method in the second aspect according to the embodiments of the present invention. When performing some or all steps of any method in the second aspect, the network packet processing apparatus may flexibly process a network packet according to different scenarios.

According to a fifth aspect, an embodiment of the present invention discloses a network server, and the network server includes a processor, a receiver, and a memory. The memory is configured to store an instruction. The processor is configured to run the instruction, and the processor runs the instruction to perform some or all steps of any method in the first aspect according to the embodiments of the present invention. When performing some or all steps of any method in the first aspect, the network server may flexibly process a network packet according to different scenarios.

According to a sixth aspect, an embodiment of the present invention discloses a network server, and the network server includes a processor and a memory. The memory is configured to store an instruction. The processor is configured to run the instruction, and the processor runs the instruction to perform some or all steps of any method in the second aspect according to the embodiments of the present invention. When performing some or all steps of any method in the second aspect, the network server may flexibly process a network packet according to different scenarios.

According to a seventh aspect, an embodiment of the present invention discloses a computer storage medium, where the computer storage medium stores a program, and the program specifically includes instructions that are used to perform some or all steps of any method in the first aspect according to the embodiments of the present invention.

According to an eighth aspect, an embodiment of the present invention discloses a computer storage medium, where the computer storage medium stores a program, and the program specifically includes instructions that are used to perform some or all steps of any method in the second aspect according to the embodiments of the present invention.

In the foregoing possible implementations, the first thread is the control thread, and after the processing the first TCP packet by using the first thread, the TCP connection status of the TCP connection changes from the unsteady TCP connection to the steady TCP connection, and when the network server allocates a first socket identifier to the TCP connection corresponding to the first TCP packet, the method further includes:

determining a first socket identifier corresponding to the first quintuple; deleting a mapping relationship between the first socket identifier and the first thread; and re-establishing a mapping relationship between the first socket identifier and a thread, so that a thread corresponding to the first socket identifier changes to a second thread, where the second thread is a data processing thread.

In this optional implementation, after the network server processes the first TCP packet by using the first thread, the network server may allocate the first socket identifier to the TCP connection corresponding to the first TCP packet, and both the first quintuple and the first socket identifier are used to identify the TCP connection corresponding to the first TCP packet. When the TCP connection status of the TCP connection changes from the unsteady TCP connection to the steady TCP connection, the network server also needs to update the mapping relationship between the first socket identifier and a thread.

In some possible implementations, the first thread is the data processing thread, and after the processing the first TCP packet by using the first thread, the TCP connection status changes from the steady TCP connection to the unsteady TCP connection, and when the network server allocates a first socket identifier to the TCP connection corresponding to the first TCP packet, the method further includes:

determining a first socket identifier corresponding to the first quintuple; deleting a mapping relationship between the first socket identifier and the first thread; and re-establishing a mapping relationship between the first socket identifier and a thread, so that a thread corresponding to the first socket identifier changes to a third thread, where the third thread is a control thread.

In this optional implementation, after the network server processes the first TCP packet by using the first thread, the network server may allocate the first socket identifier to the TCP connection corresponding to the first TCP packet, and both the first quintuple and the first socket identifier are used to identify the TCP connection corresponding to the first TCP packet. When the TCP connection status of the TCP connection changes from the steady TCP connection to the unsteady TCP connection, the network server also needs to update the mapping relationship between the first socket identifier and a thread.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1.1 is a schematic diagram of a network architecture between a client and a network server disclosed in an embodiment of the present invention;

FIG. 1.2 is a schematic flowchart of TCP message exchange between a client and a network server disclosed in an embodiment of the present invention;

DESCRIPTION OF EMBODIMENTS

Figure 2:
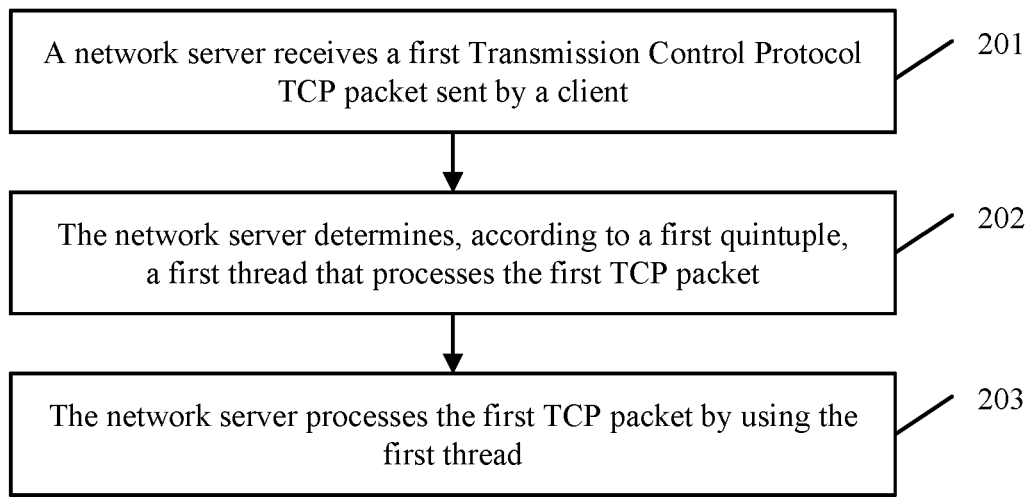
FIG. 2 is a schematic flowchart of a network packet processing method disclosed in an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Embodiments of the present invention disclose a network packet processing method and apparatus, and a network server, so as to flexibly process a network packet according to different scenarios. Details are separately described below.

To better understand the embodiments of the present invention, the following describes a schematic diagram of a network architecture between a client and a network server disclosed in an embodiment of the present invention.

Referring to FIG. 1.1, FIG. 1.1 is a schematic diagram of a network architecture between a client and a network server disclosed in an embodiment of the present invention. As shown in FIG. 1.1, the network architecture includes the client and the network server, and the client may interact with the network server by using a network, for example, TCP message exchange. Persons skilled in the art may understand that although only one client is shown in FIG. 1.1, in this embodiment of the present invention, a quantity of clients is not limited to one client that is shown in FIG. 1.1, and the quantity of clients may be greater than the one client shown in FIG. 1.1.

The client may include but is not limited to various user equipment such as a smart phone, a laptop computer, a personal computer (Personal Computer, PC), a personal digital assistant (Personal Digital Assistant, PDA), a mobile Internet device (Mobile Internet Device, MID), and an intelligent wearable device (such as a smart watch and a smart band).

The network server refers to a special-purpose device that can provide a user with services such as centralized computing, information publishing, and data management in a network environment, for example, a special-purpose computer. The network server may include a network interface card (NIC), a network packet dispatcher module, an Internet Protocol (IP) module, a Transmission Control Protocol (TCP) module, and an application (APP) program module. The NIC is mainly configured to implement TCP packet transmission between the network server and the client; a TCP packet sent by the client is transmitted to the network server by using the NIC; and a TCP packet delivered by an APP in the network server may be transmitted to the client by using the NIC. The dispatcher module may be specifically a set of threads that implement functions such as maintaining a mapping relationship between a quintuple and a thread and dispatching, according to the mapping relationship between a quintuple and a thread, a network packet to a corresponding thread for processing. The IP module may be specifically a set of threads that implement functions such as receiving a TCP packet from the dispatcher module, sending the TCP packet to the TCP module, receiving the TCP packet from the TCP module, and sending the TCP packet to the dispatcher module. The TCP module may be specifically a set of threads that implement functions such as processing the TCP packet and updating a TCP connection status of the TCP connection; in addition, the TCP module further includes a socket (Socket) module, and the socket module may be specifically a set of threads that implement functions such as maintaining a mapping relationship between a socket identifier (Socket ID) and a thread and dispatching, according to the mapping relationship between a socket identifier and a thread, a packet or an operation request that is from the APP to a corresponding thread for processing. Two programs on a network exchange data by using a bidirectional communication connection, and one end of the connection may be referred to as a socket. The two programs include a program on the client and a program on the server. A variable value that is used to identify a socket in the program may be referred to as a socket identifier.

In addition, referring to FIG. 1.2, FIG. 1.2 is a schematic flowchart of TCP message exchange between a client and a network server disclosed in an embodiment of the present invention.

TCP is a connection-oriented transport layer communications protocol. A TCP connection procedure is as follows: An end-to-end connection is first established by means of a three-way handshake, then data transmission is performed, and after communication is complete, the connection is disconnected by using a four-way handshake. As shown in FIG. 1.2, establishment of a TCP connection requires the three-way handshake. Specifically, in a first handshake, the client sends messages such as SYN=1 and Seq=X to the network server, and the client enters a synchronization sequence number sending SYN_SEND state, where the SYN represents a synchronize sequence number, and the Seq represents a sequence number. After the network server receives the SYN message sent by the client, in a second handshake, the network server returns messages such as SYN=1, ACK=X+1, and Seq=Y to the client, and the network server enters a synchronization sequence number receiving SYN_RECV state, where the ACK represents that a field is acknowledged. After the client receives the SYN message sent by the network server, in a third handshake, the client sends messages such as ACK=Y+1 and Seq=Z to the network server, and the client enters an established state. After the three-way handshake is complete, data may be transmitted between the client and the network server. However, disconnection of a TCP connection requires the four-way handshake. Specifically, in a first handshake, the client sends messages such as FIN=1, ACK=Z, and Seq=X to the network server, and enters a FIN_WAIT1 state for requesting disconnection, where the FIN represents that no data is sent any longer. After the network server receives the FIN message sent by the client, in a second handshake, the network server returns messages such as ACK=X+1 and Seq=Z to the client, and enters a close wait CLOSE_WAIT state. In a third handshake, the network server returns messages such as FIN=1, ACK=X, and Seq=Y to the client, and the network server enters a last acknowledgement LAST_ACK state. After the client receives the ACK and FIN messages that are sent by the network server, in a fourth handshake, the client sends messages such as ACK=Y+1 and Seq=X to the network server, the client enters a closed state, and the network server enters the closed state when receiving the ACK message sent by the client. After the four-way handshake is complete, a TCP connection established between the client and the network server is disconnected. Optionally, the TCP connection may be quickly closed by using a connection reset message RST.

It can be learned from the foregoing description that a TCP connection status of the TCP connection between the client and the network server is mainly an unsteady TCP connection or a steady TCP connection. The unsteady TCP connection represents a TCP connection in an establishment process or a disconnection process, and the steady TCP connection represents a TCP connection in a data transmission process.

In the flowchart shown in FIG. 1.2, when the network server receives a first TCP packet sent by the client, the network server may process, according to a current mapping relationship between a first quintuple and a thread, the first TCP packet by using different threads. If the current mapping relationship between a first quintuple carried in the first TCP packet and a thread is a mapping relationship between a first quintuple and a control thread, the network server may process the first TCP packet by using a control thread; or if the current mapping relationship between a first quintuple carried in the first TCP packet and a thread is a mapping relationship between a first quintuple and a data processing thread, the network server may process the first TCP packet by using a data processing thread. Therefore, a network packet may be flexibly processed according to different scenarios.

In addition, in this embodiment of the present invention, multiple TCP modules that include independent resources and that may be executed in parallel exist in a system. The TCP modules may be executed in parallel by multiple threads in a manner of supporting multi-thread resource sharing access, or may be executed in parallel by multiple threads in a resource isolation manner. In addition, one process may include multiple threads. The TCP modules may also be executed in parallel by the threads that are included in multiple processes in a manner of supporting multi-process resource sharing access, or may be executed in parallel by threads that are included in multiple processes in a resource isolation manner. The thread is mainly divided into two types: a control thread and a data processing thread. The control thread is used to process the unsteady TCP connection, and the data processing thread is used to process the steady TCP connection. For a TCP packet exchanged between the client and the network server, the TCP packet may be dispatched to different threads (the control thread or the data processing thread) according to a mapping relationship between a quintuple and a thread or a mapping relationship between a socket identifier and a thread, so that the thread may separately process a TCP connection in different TCP connection states.

In this case, the control thread is responsible for processing only the unsteady TCP connection (that is, the TCP connection in the establishment process or the disconnection process), and the data processing thread is responsible for processing only the steady TCP connection (that is, the TCP connection in the data transmission process). Transmission of a large amount of data may not affect establishment or disconnection of the TCP connection, and establishment or disconnection of a large quantity of the TCP connections may not affect the data transmission. The network server may process TCP packets of multiple TCP connections in parallel, so as to improve network packet processing efficiency.

Referring to FIG. 2, FIG. 2 is a schematic flowchart of a network packet processing method disclosed in an embodiment of the present invention. The network packet processing method is applied to a network server. As shown in FIG. 2, the network packet processing method may include the following steps:

201. The network server receives a first Transmission Control Protocol TCP packet sent by a client.

In this embodiment of the present invention, the network server may receive, by using an NIC, the first Transmission Control Protocol TCP packet sent by the client; and further, the network server may parse a first TCP packet, to obtain a quintuple carried in the first TCP packet, that is, a first quintuple.

The first TCP packet may be a handshake packet that is used by the client to request to establish a TCP connection, for example, an SYN packet and an ACK packet; or the first TCP packet may be a data packet transmitted between the client and the network server; or the first TCP packet may be a handshake packet that is used by the client to request to disconnect a TCP connection, for example, a FIN packet or an ACK packet.

The first quintuple includes a source address, a source port, a destination address, a destination port, and a transmission type that are in the first TCP packet, where the transmission type may be a TCP type. The first quintuple may be used to identify a first TCP connection. For example, a quintuple includes 192.168.1.1 10000 TCP 121.14.88.76 80, and it means that a client whose IP address is 192.168.1.1 is connected to a client whose port number is 80 and IP address is 121.14.88.76 by using a port number 10000 and a TCP protocol.

202. The network server determines, according to a first quintuple, a first thread that processes the first TCP packet.

The first quintuple is used to identify a TCP connection corresponding to the first TCP packet. A TCP connection status of the TCP connection is an unsteady TCP connection or a steady TCP connection. The unsteady TCP connection represents a TCP connection in an establishment process or a disconnection process, and the steady TCP connection represents a TCP connection in a data transmission process. The first thread is a control thread or a data processing thread. The control thread is used to process the unsteady TCP connection, and the data processing thread is used to process the steady TCP connection.

In this embodiment of the present invention, a manner in which the network server determines, according to the first quintuple, the first thread that processes the first TCP packet may include but is not limited to the following two manners.

Optionally, the manner in which the network server determines, according to the first quintuple, the first thread that processes the first TCP packet may specifically include:

determining, according to the first quintuple, the TCP connection corresponding to the first TCP packet, and determining a status of the TCP connection; and determining, according to the status of the TCP connection, the first thread that processes the first TCP packet.

In this optional implementation, because the quintuple may be used to identify the TCP connection corresponding to the TCP packet, the network server may determine, according to the first quintuple, the TCP connection corresponding to the first TCP packet, and further, may query a TCP connection status of a TCP connection recorded in a system. Therefore, the network server may determine, according to the TCP connection status of the TCP connection, the first thread that processes the first TCP packet. Specifically, when the TCP connection status is the steady TCP connection, the first thread is the data processing thread; or when the TCP connection status is the unsteady TCP connection, the first thread is the control thread.

Optionally, the manner in which the network server determines, according to the first quintuple, the first thread that processes the first TCP packet may specifically include:

determining, according to a current mapping relationship between the first quintuple and a thread, a first thread corresponding to the first quintuple under the current mapping relationship, where a mapping relationship between the first quintuple and the thread changes when the TCP connection status of the TCP connection changes.

Figure 3A:
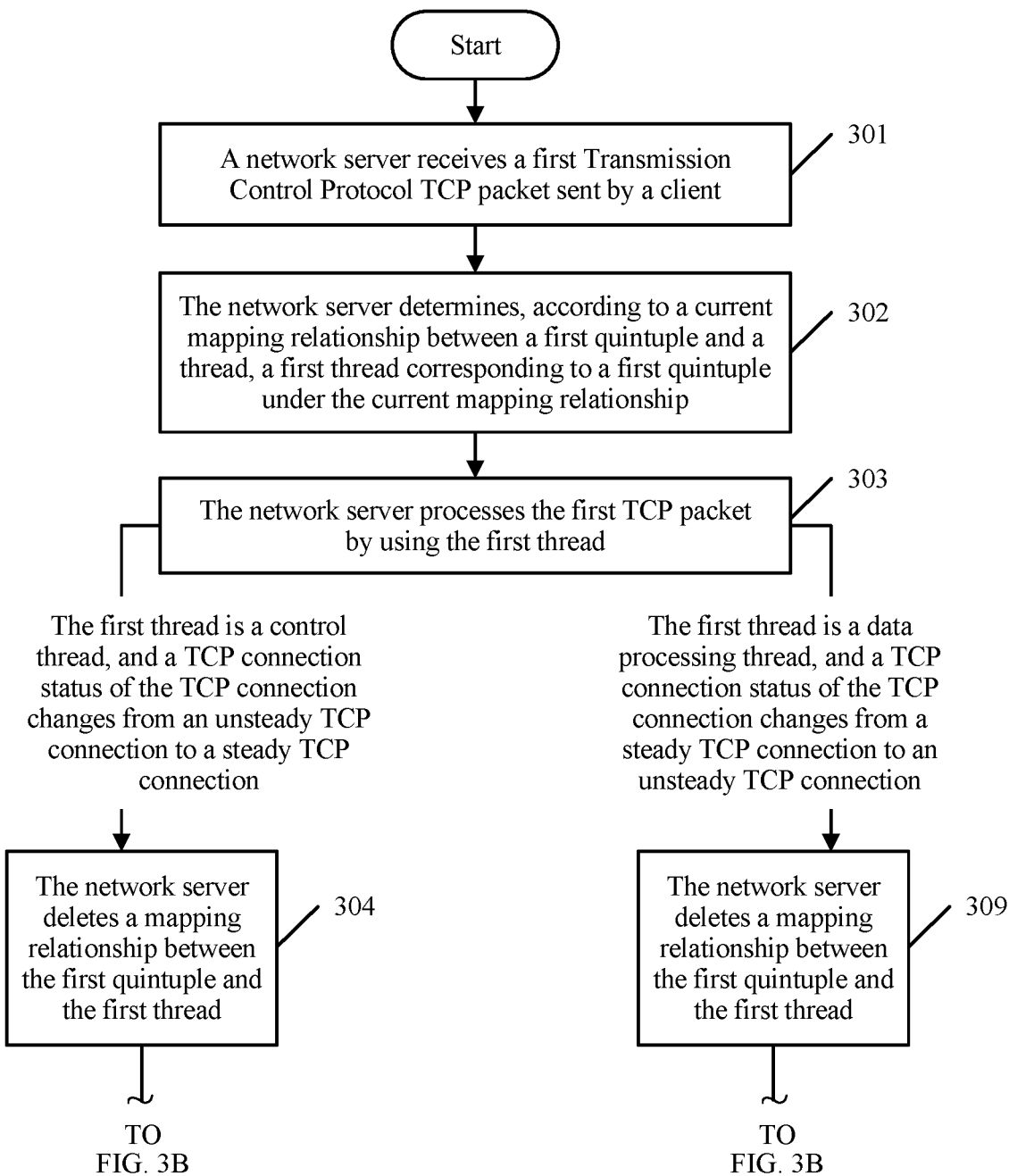
FIG. 3A and FIG. 3B are a schematic flowchart of another network packet processing method disclosed in an embodiment of the present invention.
Figure 3B:
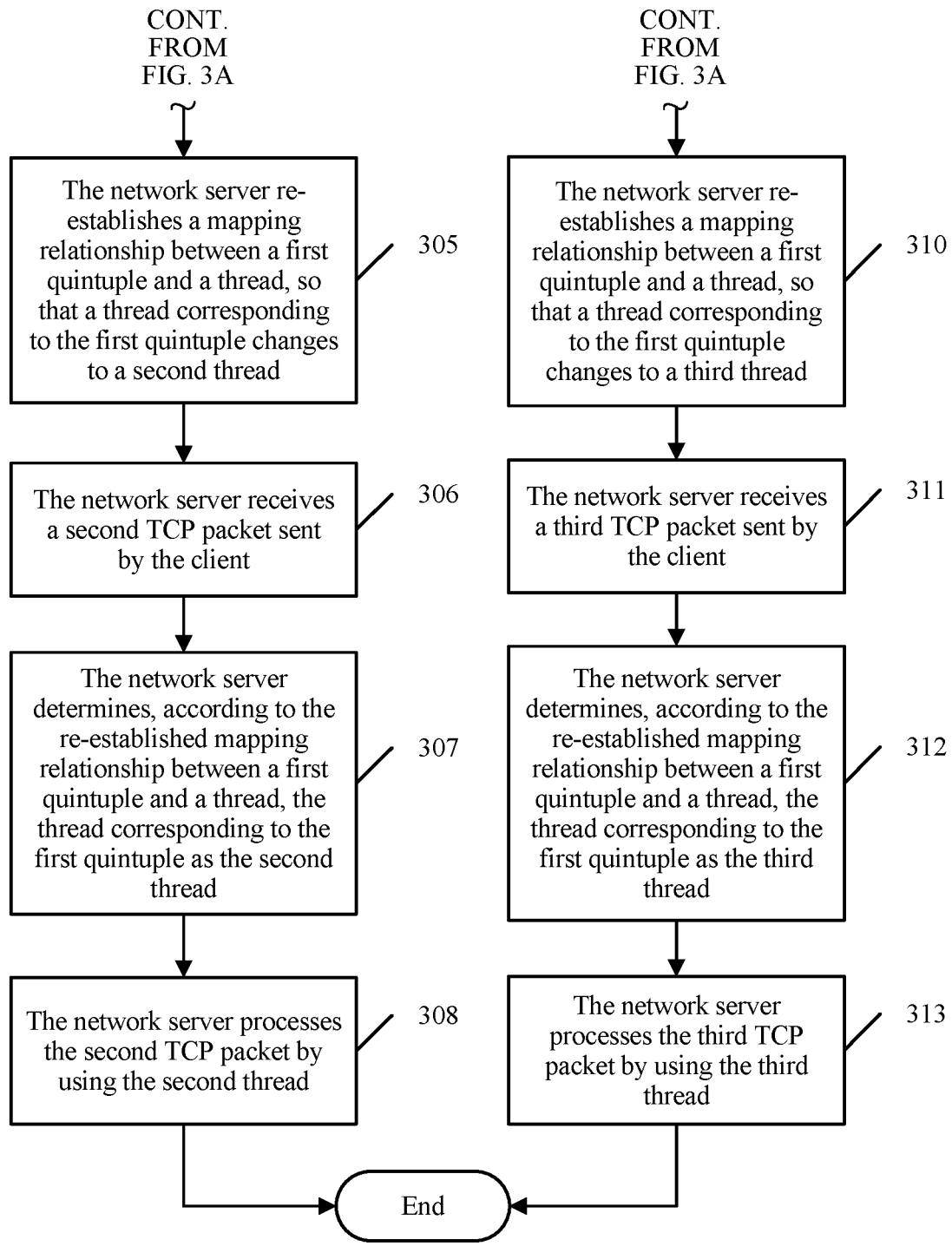

In this optional implementation, for detailed description, refer to the description in FIG. 3A and FIG. 3B. Details are not described herein again.

203. The network server processes the first TCP packet by using the first thread.

Specifically, the network server may dispatch the first TCP packet to a message uplink queue of the first thread by using a dispatcher module, and the first thread processes the first TCP packet by using a TCP module.

In the procedure of the method described in FIG. 2, after the network server receives the first TCP packet, the network server may determine, according to the first quintuple, the first thread that processes the first TCP packet. If the first thread is the control thread, the network server may process the first TCP packet by using the control thread; or if the first thread is the data processing thread, the network server may process the first TCP packet by using the data processing thread. Therefore, adaptive processing may be performed on a network packet according to the status of the TCP connection.

In addition, for each TCP connection, the network server may process a TCP packet of the TCP connection according to the foregoing steps. When there are a large quantity of TCP connections, the network server performs adaptive processing on the network packet according to the status of the TCP connection, so that the unsteady TCP connection and the steady TCP connection do not affect each other. In addition, the network server may process in parallel a TCP packet of the unsteady TCP connection and a TCP packet of the steady TCP connection, so as to improve TCP connection processing efficiency of the network server.

Referring to FIG. 3A and FIG. 3B, FIG. 3A and FIG. 3B are a schematic flowchart of a network packet processing method disclosed in an embodiment of the present invention. The network packet processing method is applied to a network server. As shown in FIG. 3A and FIG. 3B, the network packet processing method may include the following steps:

301. The network server receives a first Transmission Control Protocol TCP packet sent by a client.

302. The network server determines, according to a current mapping relationship between a first quintuple and a thread, a first thread corresponding to a first quintuple under the current mapping relationship.

The first quintuple is used to identify a TCP connection corresponding to the first TCP packet, and the mapping relationship between a first quintuple and a thread changes when a TCP connection status of a TCP connection changes. The TCP connection status is an unsteady TCP connection or a steady TCP connection. The unsteady TCP connection represents a TCP connection in an establishment process or a disconnection process, and the steady TCP connection represents a TCP connection in a data transmission process. A thread is a control thread or a data processing thread. The control thread is used to process the unsteady TCP connection, and the data processing thread is used to process the steady TCP connection. That is, a thread corresponding to the first quintuple may be the control thread, or a thread corresponding to the first quintuple may be the data processing thread.

Specifically, the control thread is a pre-control thread or a post-control thread, the pre-control thread is used to process an establishment process of the TCP connection in an unsteady TCP connection state, and the post-control thread is used to process a disconnection process of the TCP connection in an unsteady TCP connection state.

In this embodiment of the present invention, after the network server obtains the first quintuple carried in the first TCP packet, the network server may query the current mapping relationship between a first quintuple and a thread, to determine the first thread corresponding to the first quintuple under the current mapping relationship.

In an optional implementation, when the first TCP packet is a first packet (which usually is a first handshake packet used to request to establish a TCP connection) sent by the client, the network server may find no current mapping relationship between a first quintuple and a thread. In this case, the network server may process the first TCP packet by using a default thread, and the default thread may be a control thread that is set by a system, or the default thread may be a control thread that is set by a user.

303. The network server processes the first TCP packet by using the first thread.

Specifically, the network server may dispatch the first TCP packet to a message uplink queue of the first thread by using a dispatcher module, and the first thread processes the first TCP packet by using a TCP module.

In this embodiment of the present invention, optionally, if the first thread is the control thread, after the network server processes the first TCP packet by using the first thread, the TCP connection status of the TCP connection changes from the unsteady TCP connection to the steady TCP connection, and steps 204 to 208 are performed; or if the first thread is the data processing thread, after the network server processes the first TCP packet by using the first thread, the TCP connection status of the TCP connection changes from the steady TCP connection to the unsteady TCP connection, and steps 209 to 213 are performed.

In this embodiment of the present invention, before the network server processes the first TCP packet by using the first thread, and after the network server processes the first TCP packet by using the first thread, the TCP connection status of the TCP connection corresponding to the first TCP packet may change, or may not change.

For example, the first TCP packet is a third handshake packet that is used to request to establish a TCP connection. Before the third handshake packet is processed by the first thread, a TCP connection is in an establishment process, and is the unsteady TCP connection. After the third handshake packet is processed by the first thread, the establishment process of the TCP connection ends, that is, the TCP connection is successfully established, and data transmission can be performed. In this case, a TCP connection status of the TCP connection changes to the steady TCP connection. That is, after the network server processes, by using the first thread, the third handshake packet that is used to request to establish a TCP connection, the TCP connection status of the TCP connection changes from the unsteady TCP connection to the steady TCP connection.

For another example, the first TCP packet is a first handshake packet or a second handshake packet that is used to request to establish a TCP connection. Before the first handshake packet or the second handshake packet is processed by the first thread, a TCP connection is in an establishment process, and is the unsteady TCP connection. After the first handshake packet or the second handshake packet is processed by the first thread, the TCP connection is still in the establishment process, and is the unsteady TCP connection. That is, in this case, after the network server processes, by using the first thread, the first handshake packet or the second handshake packet that is used to request to establish a TCP connection, a TCP connection status of the TCP connection does not change, and is still the unsteady TCP connection.

304. The first thread is a control thread, and after the network server processes the first TCP packet by using the first thread, a TCP connection status of a TCP connection changes from an unsteady TCP connection to a steady TCP connection, and the network server deletes a mapping relationship between the first quintuple and the first thread.

In this embodiment of the present invention, before or after the network server processes the first TCP packet by using the first thread, if the TCP connection status corresponding to the first TCP packet changes from the unsteady TCP connection to the steady TCP connection, and the steady TCP connection is processed by the data processing thread, in this case, the mapping relationship between the first quintuple and the first thread is no longer applicable, and the network server needs to delete the mapping relationship between the first quintuple and the first thread.

305. The network server re-establishes a mapping relationship between a first quintuple and a thread, so that a thread corresponding to the first quintuple changes to a second thread.

The second thread is the data processing thread.

In this embodiment of the present invention, the network server further needs to re-establish the mapping relationship between a first quintuple and a thread while the network server deletes the mapping relationship between the first quintuple and the first thread, so that the thread corresponding to the first quintuple changes to the second thread, where the second thread is the data processing thread.

Specifically, the network server may re-establish the mapping relationship between a first quintuple and a thread by using the dispatcher module, so that the thread corresponding to the first quintuple changes to the second thread, where the second thread is the data processing thread.

Therefore, for a subsequent TCP packet of the TCP connection, the second thread may be determined according to the re-established mapping relationship between a first quintuple and a thread, and the subsequent TCP packet is processed by using the second thread.

In another optional implementation, in this embodiment of the present invention, if a TCP module in a system is executed in parallel by multiple threads (the control thread or the data processing thread) in a resource isolation manner, the network server may transfer a TCP connection resource of a TCP connection that matches the first quintuple from the control thread to the data processing thread. The TCP connection resource refers to a program structure storing one TCP connection, and the program structure may save any one of the following items: control block information, a control status, a related timer, a sending buffer, or a receiving buffer of the TCP connection.

In another optional implementation, when the network server allocates a first socket identifier to the TCP connection corresponding to the first TCP packet, the network server further needs to perform the following steps:

(11) Determining a first socket identifier corresponding to the first quintuple;

(12) Deleting a mapping relationship between a first socket identifier and a first thread; and

(13) Re-establishing a mapping relationship between a first socket identifier and a thread, so that a thread corresponding to the first socket identifier changes to the second thread, where the second thread is the data processing thread.

In this optional implementation, after the network server processes the first TCP packet by using the first thread, the network server may allocate the first socket identifier to the TCP connection corresponding to the first TCP packet, and both the first quintuple and the first socket identifier are used to identify the TCP connection corresponding to the first TCP packet. When the TCP connection status of the TCP connection changes, the network server also needs to update the mapping relationship between a first socket identifier and a thread.

Specifically, the network server may delete the mapping relationship between a first socket identifier and a first thread by using a socket module, and re-establish the mapping relationship between a first socket identifier and a thread by using the socket module.

306. The network server receives a second TCP packet sent by the client.

The second TCP packet includes the first quintuple. It can be learned that the second TCP packet and the first TCP packet belong to a same TCP connection. The second TCP packet may be considered as a subsequent TCP packet of the TCP connection after the first TCP packet is processed.

307. The network server determines, according to the re-established mapping relationship between a first quintuple and a thread, a thread corresponding to the first quintuple as the second thread.

In this embodiment of the present invention, after the first TCP packet is processed by the first thread, the re-established mapping relationship between a first quintuple and a thread is a mapping relationship between a first quintuple and a second thread. Therefore, the network server receives the second TCP packet sent by the client, and determines, according to the re-established mapping relationship between a first quintuple and a thread, the thread corresponding to the first quintuple as the second thread, where the second thread is the data processing thread.

The re-established mapping relationship between a first quintuple and a thread may be understood as a current mapping relationship between a first quintuple and a thread when the second TCP packet sent by the client is received. Each time the TCP packet sent by the client is received, the network server needs to determine a to-be-used thread according to the current mapping relationship between a quintuple and a thread.

308. The network server processes the second TCP packet by using the second thread, and this procedure ends.

Specifically, the network server may dispatch the second TCP packet to a message uplink queue of the second thread by using the dispatcher module, and the second thread processes the second TCP packet by using the TCP module.

In another optional implementation, after the network server processes the second TCP packet by using the second thread, if the TCP connection status of the TCP connection changes, the network server also needs to perform corresponding processing according to the foregoing steps. Details are not described herein again.

309. The first thread is a data processing thread, and after the network server processes the first TCP packet by using the first thread, a TCP connection status of a TCP connection changes from a steady TCP connection to an unsteady TCP connection, and the network server deletes a mapping relationship between the first quintuple and the first thread.

In this embodiment of the present invention, before the network server processes the first TCP packet by using the first thread, and after the network server processes the first TCP packet by using the first thread, the TCP connection status of the TCP connection corresponding to the first TCP packet may change, or may not change.

For example, the first TCP packet is a handshake packet that is used to request to disconnect a TCP connection. Before the handshake packet that is used to request to disconnect a TCP connection is processed by the first thread, a TCP connection is in a data transmission process, and is the steady TCP connection. After the handshake packet that is used to request to disconnect a TCP connection is processed by the first thread, the TCP connection is in a disconnection process, and is the unsteady TCP connection. That is, after the network server processes, by using the first thread, the handshake packet that is used to request to disconnect a TCP connection, the TCP connection status of the TCP connection changes from the steady TCP connection to the unsteady TCP connection.

For another example, the first TCP packet is the data transmission packet. Before the data transmission packet is processed by the first thread, a TCP connection is in a data transmission process, and is the steady TCP connection. After the data transmission packet is processed by the first thread, the TCP connection is still in the data transmission process, and is still the steady TCP connection. That is, in this case, after the network server processes the data transmission packet by using the first thread, a TCP connection status of the TCP connection does not change, and is still the steady TCP connection.

In this embodiment of the present invention, before or after the network server processes the first TCP packet by using the first thread, if the TCP connection status corresponding to the first TCP packet changes from the steady TCP connection to the unsteady TCP connection, and the unsteady TCP connection is processed by the control thread, in this case, the mapping relationship between the first quintuple and the first thread is no longer applicable, and the network server needs to delete the mapping relationship between the first quintuple and the first thread.

310. The network server re-establishes a mapping relationship between a first quintuple and a thread, so that a thread corresponding to the first quintuple changes to a third thread.

The third thread is the control thread.

In this embodiment of the present invention, the network server further needs to re-establish the mapping relationship between a first quintuple and a thread while the network server deletes the mapping relationship between the first quintuple and the first thread, so that the thread corresponding to the first quintuple changes to the third thread, where the third thread is the control thread.

Specifically, the network server may re-establish the mapping relationship between a first quintuple and a thread by using the dispatcher module, so that the thread corresponding to the first quintuple changes to the third thread, where the third thread is the control thread.

Therefore, for a subsequent TCP packet of the TCP connection, the third thread may be determined according to the re-established mapping relationship between a first quintuple and a thread, and the subsequent TCP packet is processed by using the third thread.

In another optional implementation, when the network server allocates a first socket identifier to the TCP connection corresponding to the first TCP packet, the network server further needs to perform the following steps:

(21) Determining a first socket identifier corresponding to the first quintuple;

(22) Deleting a mapping relationship between a first socket identifier and a first thread; and

(23) Re-establishing a mapping relationship between a first socket identifier and a thread, so that a thread corresponding to the first socket identifier changes to the third thread, where the third thread is the control thread.

In this optional implementation, after the network server processes the first TCP packet by using the first thread, the network server may allocate the first socket identifier to the TCP connection corresponding to the first TCP packet, and both the first quintuple and the first socket identifier are used to identify the TCP connection corresponding to the first TCP packet. When the TCP connection status of the TCP connection changes, the network server also needs to update the mapping relationship between a first socket identifier and a thread.

Specifically, the network server may delete the mapping relationship between a first socket identifier and a first thread by using a socket module, and re-establish the mapping relationship between a first socket identifier and a thread by using the socket module.

311. The network server receives a third TCP packet sent by the client.

The third TCP packet includes the first quintuple. It can be learned that the third TCP packet and the first TCP packet belong to a same TCP connection. The third TCP packet may be considered as a subsequent TCP packet of the TCP connection after the first TCP packet is processed.

312. The network server determines, according to the re-established mapping relationship between a first quintuple and a thread, the thread corresponding to the first quintuple as a third thread.

In this embodiment of the present invention, after the first TCP packet is processed by the first thread, the re-established mapping relationship between a first quintuple and a thread is a mapping relationship between a first quintuple and a third thread. Therefore, the network server receives the third TCP packet sent by the client, and determines, according to the re-established mapping relationship between a first quintuple and a thread, the thread corresponding to the first quintuple as the third thread, where the third thread is the control thread.

The re-established mapping relationship between a first quintuple and a thread may be understood as a current mapping relationship between a first quintuple and a thread when the third TCP packet sent by the client is received. Each time the TCP packet sent by the client is received, the network server needs to determine a to-be-used thread according to the current mapping relationship between a quintuple and a thread.

313. The network server processes the third TCP packet by using the third thread.

In another optional implementation, the network server may form a set including threads that process a same TCP connection status, for example, a control thread set or a data processing thread set. The control thread set includes multiple control threads, and each control thread in the control thread set is used to process the unsteady TCP connection. The data processing thread set includes multiple data processing threads, and each data processing thread in the data processing thread set is used to process the steady TCP connection. When establishing a mapping relationship between a quintuple and a control thread, the network server may select, according to a preset rule, a target control thread from the control thread set to establish the mapping relationship. Likewise, when establishing a mapping relationship between a quintuple and a data processing thread, the network server may select, according to a preset rule, a target data processing thread from the data processing thread set to establish the mapping relationship. The preset rule may be a minimum load (for example, a CPU usage or a memory usage) rule.

In addition, different ratios of a quantity of control threads included in the control thread set to a quantity of data processing threads included in the data processing thread set may be set according to different application scenarios. For example, transmission of user data needs to be preferentially processed in an application, and when a TCP protocol stack is initialized, a larger quantity of data processing threads that are responsible for processing the steady TCP connection may be configured in the data processing thread set. For another example, a new connection access capability needs to be preferentially processed in an application, and when a TCP protocol stack is initialized, a larger quantity of control threads that are responsible for processing the unsteady TCP connection may be configured in the control thread set.

In addition, the quantity of control threads and the quantity of data processing threads may be further dynamically configured according to packet traffic. For example, during a period of time, if the network server needs to process a large amount of TCP connection access, and a larger quantity of control threads that are responsible for processing the unsteady TCP connection may be configured in the control thread set; or if the network server needs to process a large amount of user data, a larger quantity of data processing threads that are responsible for processing the steady TCP connection may be configured in the data processing thread set.

It can be learned that in this optional implementation, the network server may set, according to different requirements of a user, the quantity of control threads included in the control thread set and the quantity of data processing threads included in the data processing thread set; and in addition, when a mapping relationship is established, the target control thread or the target data processing thread may be selected according to a preset rule. In a system that supports a parallel CPU computing capability, the TCP protocol stack may effectively use a CPU resource, and may support a higher TCP connection concurrent capability, a more efficient TCP connection processing capability, and a more efficient user packet processing capability.

In another optional implementation, the TCP connection status (the unsteady TCP connection and the steady TCP connection) may be further divided into three statuses: a pre-steady TCP connection, a steady TCP connection, and a post-steady TCP connection. The pre-steady TCP connection refers to all connection statuses whose statuses change before the TCP connection is successfully established, that is, a TCP connection in an establishment process. The steady TCP connection is a TCP connection in a data transmission processing. The post-steady TCP connection refers to other statuses after a TCP connection status changes from the steady TCP connection, that is, a TCP connection in a disconnection process.

In addition, optionally, control threads in a system may be divided into a pre-control thread and a post-control thread. The pre-control thread is used to process an establishment process of the TCP connection in an unsteady TCP connection state, and the post-control thread is used to process a disconnection process of the TCP connection in an unsteady TCP connection state. In this way, thread division in the system is more refined, so that the system supports a higher TCP connection concurrent capability and a more efficient TCP packet processing capability.

In the procedure of the method described in FIG. 3A and FIG. 3B, after the network server receives the first TCP packet, the network server may determine, according to the first quintuple, the first thread that processes the first TCP packet. If the first thread is the control thread, the network server may process the first TCP packet by using the control thread; or if the first thread is the data processing thread, the network server may process the first TCP packet by using the data processing thread. Therefore, adaptive processing may be performed on a network packet according to the status of the TCP connection.

In addition, for each TCP connection, the network server may process a TCP packet of the TCP connection according to the foregoing steps. When there are a large quantity of TCP connections, the network server performs adaptive processing on the network packet according to the status of the TCP connection, so that the unsteady TCP connection and the steady TCP connection do not affect each other. In addition, the network server may process in parallel a TCP packet of the unsteady TCP connection and a TCP packet of the steady TCP connection, so as to improve TCP connection processing efficiency of the network server.

Figure 4:
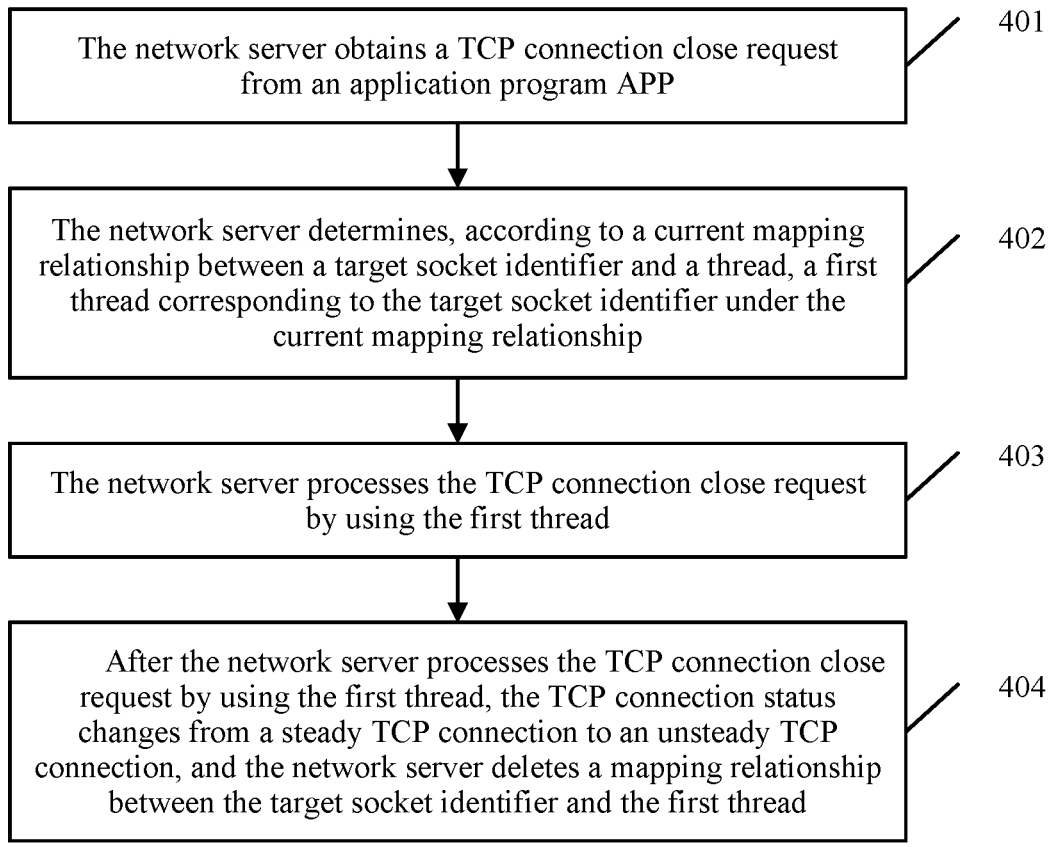
FIG. 4 is a schematic flowchart of another network packet processing method disclosed in an embodiment of the present invention.

Referring to FIG. 4, FIG. 4 is a schematic flowchart of another network packet processing method disclosed in an embodiment of the present invention. The network packet processing method is applied to a network server. As shown in FIG. 4, the network packet processing method may include the following steps:

401. The network server obtains a TCP connection close request from an application program APP.

In this embodiment of the present invention, after data transmission between the network server and a client is complete, a TCP connection needs to be disconnected. In this case, generation of the TCP connection close request may be triggered by an application program APP module. The TCP connection close request includes a target socket identifier, and the TCP connection close request is used to request to disconnect a TCP connection identified by the target socket identifier.

402. The network server determines, according to the target socket identifier, a first thread that processes the TCP connection close request.

A TCP connection status of the TCP connection is an unsteady TCP connection or a steady TCP connection. The unsteady TCP connection represents a TCP connection in an establishment process or a disconnection process, and the steady TCP connection represents a TCP connection in a data transmission process. The first thread is a data processing thread, and the data processing thread is used to process the steady TCP connection.

In this embodiment of the present invention, a manner in which the network server determines, according to the target socket identifier, the first thread that processes the TCP connection close request may include but is not limited to the following two manners.

Optionally, a manner in which the network server determines, according to the target socket identifier, the first thread that processes the TCP connection close request may specifically include:

determining a corresponding TCP connection that is identified by the target socket identifier, and determining a status of the TCP connection; and determining, according to the status of the TCP connection, the first thread that processes the TCP connection close request.

In this optional implementation, because the socket identifier may be used to identify a TCP connection, the network server may determine, according to the target socket identifier, the TCP connection identified by the target socket identifier, and further, may query a TCP connection status of a TCP connection recorded in a system. Therefore, the network server may determine, according to the TCP connection status of the TCP connection, the first thread that processes the TCP connection close request.

Optionally, the manner in which the network server determines, according to the first quintuple, the first thread that processes the first TCP packet may specifically include:

The network server determines, according to a current mapping relationship between a target socket identifier and a thread, a first thread corresponding to the target socket identifier under the current mapping relationship.

In this optional implementation, after obtaining the TCP connection close request from the application program APP, the network server may obtain the target socket identifier from the TCP connection close request, and query the current mapping relationship between a target socket identifier and a thread for the first thread corresponding to the target socket identifier under the current mapping relationship.

The mapping relationship between a target socket identifier and a thread changes when the TCP connection status of the TCP connection identified by the target socket identifier changes. The TCP connection status of the TCP connection is an unsteady TCP connection or a steady TCP connection. The unsteady TCP connection represents a TCP connection in an establishment process or a disconnection process, and the steady TCP connection represents a TCP connection in a data transmission process. The first thread is the data processing thread, and the data processing thread is used to process the steady TCP connection.

403. The network server processes the TCP connection close request by using the first thread.

In an optional implementation, when the network server determines, according to the current mapping relationship between a target socket identifier and a thread, the first thread corresponding to the target socket identifier under the current mapping relationship, and after the network server processes the TCP connection close request by using the first thread, the TCP connection status of the TCP connection changes from the steady TCP connection to the unsteady TCP connection, and the method may further include the following steps:

The network server deletes the mapping relationship between a target socket identifier and a first thread.

In this optional implementation, before the network server obtains the TCP connection close request from the application program APP, a TCP connection in a data transmission process between the network server and the client is a steady TCP connection. After the network server processes the TCP connection close request by using the first thread, the TCP connection status of the TCP connection changes from the steady TCP connection to the unsteady TCP connection, and the TCP connection status changes. In this case, an original mapping relationship between a target socket identifier and a first thread is no longer applicable. The unsteady TCP connection is processed by the control thread, and the TCP connection identified by the target socket identifier is disconnected. The network server needs to delete the mapping relationship between a target socket identifier and a first thread.

Specifically, the network server may delete the mapping relationship between a target socket identifier and a first thread by using a socket module.

In an optional implementation, the network server may further perform the following steps:

(11) Determining a target quintuple corresponding to the target socket identifier; and

(12) Deleting a mapping relationship between a target quintuple and a first thread.

In this optional implementation, after the network server processes a TCP packet, the network server may allocate the target socket identifier to a TCP connection corresponding to the TCP packet, and the TCP packet includes the target quintuple. Both the target quintuple and the target socket identifier are used to identify the TCP connection corresponding to the TCP packet. For a same TCP connection, after the network server processes the TCP connection close request by using the first thread, and when the TCP connection status changes from the steady TCP connection to the unsteady TCP connection, the TCP connection identified by the target socket identifier is disconnected. Because both the target quintuple and the target socket identifier are used to identify a same TCP connection, the network server also needs to delete the mapping relationship between a target quintuple and a first thread.

In the procedure of the method described in FIG. 4, the network server may determine, according to the current mapping relationship between a target socket identifier and a thread, the first thread corresponding to the target socket identifier under the current mapping relationship, and process the TCP connection close request from the APP by using the first thread, where the first thread is the data processing thread, and the data processing thread is used to process the steady TCP connection. Therefore, an impact on data transmission caused by disconnection of massive TCP connections may be avoided.

Figure 5:
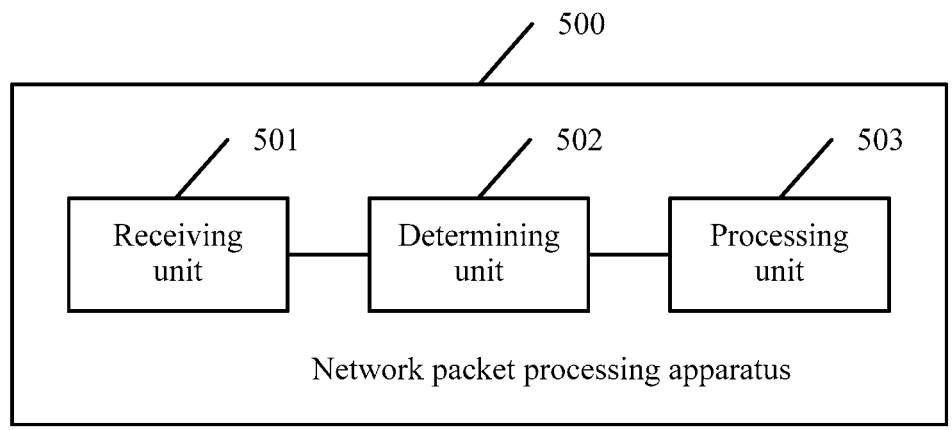
FIG. 5 is a schematic structural diagram of a network packet processing apparatus disclosed in an embodiment of the present invention.

Referring to FIG. 5, FIG. 5 is a schematic structural diagram of a network packet processing apparatus disclosed in an embodiment of the present invention. The network packet processing apparatus is configured to perform some or all steps in the network packet processing method described in FIG. 2 or FIG. 3A and FIG. 3B. For details, refer to related description of FIG. 2 or FIG. 3A and FIG. 3B. Details are not described herein again. As shown in FIG. 5, the network packet processing apparatus 500 may include: a receiving unit 501, a determining unit 502, and a processing unit 503.

The receiving unit 501 is configured to receive a first Transmission Control Protocol TCP packet sent by a client, where the first TCP packet includes a first quintuple.

The determining unit 502 is configured to determine, according to the first quintuple, a first thread that processes the first TCP packet, where the first quintuple is used to identify a TCP connection corresponding to the first TCP packet, a TCP connection status of the TCP connection is an unsteady TCP connection or a steady TCP connection, the unsteady TCP connection represents a TCP connection in an establishment process or a disconnection process, the steady TCP connection represents a TCP connection in a data transmission process, the first thread is a control thread or a data processing thread, the control thread is used to process the unsteady TCP connection, and the data processing thread is used to process the steady TCP connection.

Optionally, a manner in which the determining unit 502 determines, according to the first quintuple, the first thread that processes the first TCP packet specifically includes:

determining, according to a current mapping relationship between the first quintuple and a thread, a first thread corresponding to the first quintuple under the current mapping relationship, where a mapping relationship between the first quintuple and the thread changes when the TCP connection status of the TCP connection changes.

Optionally, the control thread is a pre-control thread or a post-control thread, the pre-control thread is used to process an establishment process of the TCP connection in an unsteady TCP connection state, and the post-control thread is used to process a disconnection process of the TCP connection in an unsteady TCP connection state.

The processing unit 503 is configured to process the first TCP packet by using the first thread.

In the network packet processing apparatus 500 described in FIG. 5, after the receiving unit 501 receives the first TCP packet, the determining unit 502 may determine, according to the first quintuple, the first thread that processes the first TCP packet. If the first thread is the control thread, the processing unit 503 may process the first TCP packet by using the control thread. If the first thread is the data processing thread, the processing unit 503 may process the first TCP packet by using the data processing thread, so that adaptive processing may be performed on a network packet according to the status of the TCP connection.

In addition, for each TCP connection, the network server may process a TCP packet of the TCP connection according to the foregoing steps. When there are a large quantity of TCP connections, the network server performs adaptive processing on the network packet according to the status of the TCP connection, so that the unsteady TCP connection and the steady TCP connection do not affect each other. In addition, the network server may process in parallel a TCP packet of the unsteady TCP connection and a TCP packet of the steady TCP connection, so as to improve TCP connection processing efficiency of the network server.

Figure 6:
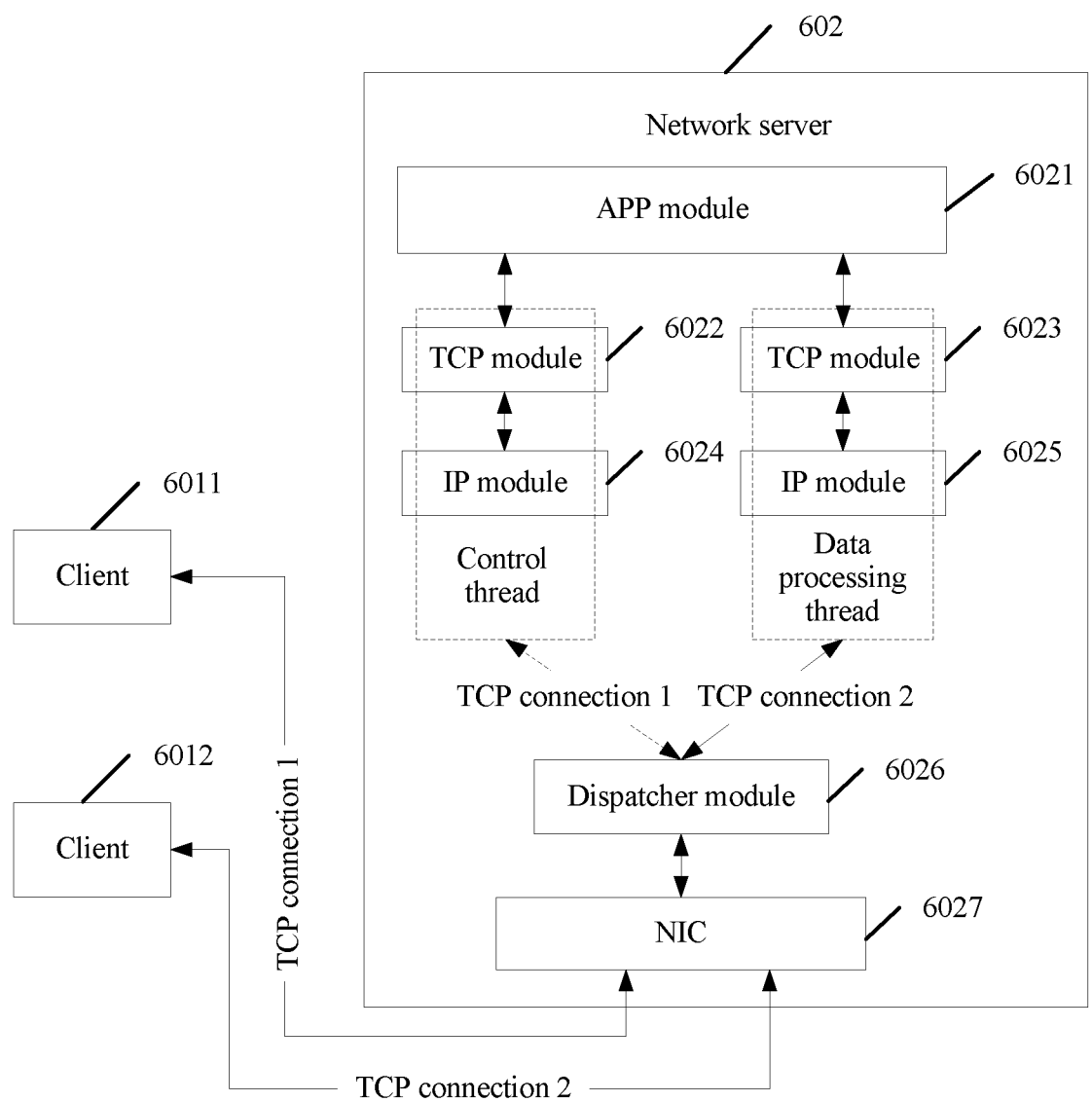
FIG. 6 is a schematic diagram of interaction between a client and a network server disclosed in an embodiment of the present invention.

Referring to FIG. 6, FIG. 6 is a schematic diagram of interaction between a client and a network server disclosed in an embodiment of the present invention. As shown in FIG. 6, a client 6011, a client 6012, and a network server 602 are included. The network server 602 includes an APP module 6021, a TCP module 6022, a TCP module 6023, an IP module 6024, an IP module 6025, a dispatcher module 6026, and an NIC module 6027.

A TCP connection corresponding to a TCP packet that is exchanged between the client 6011 and the network server 602 is a TCP connection 1; and a TCP connection corresponding to a TCP packet that is exchanged between the client 6012 and the network server 602 is a TCP connection 2. The NIC module 6027 included in the network server 602 may receive a TCP packet from the client 6011, and receive a TCP packet from the client 6012. After the TCP packet is received, the NIC module 6027 may send the TCP packet to the dispatcher module 6026. For each TCP packet, the dispatcher module 6026 may parse out a quintuple carried in the TCP packet, and determine, according to the quintuple carried in the TCP packet, a thread that processes the TCP packet, where the thread may be a control thread or a data processing thread, the control thread is used to process an unsteady TCP connection, and the data processing thread is used to process a steady TCP connection. Further, the dispatcher module 6026 may dispatch, according to a communication mechanism between processes or threads, the TCP packet to a corresponding thread. One process may include multiple threads.

For example, the dispatcher module 6026 dispatches the TCP packet that is from the client 6011 to the control thread, reports, by using the IP module 6024, the TCP packet to the TCP module 6022 for processing, and notifies the APP 6021 module of a result of the processing. For another example, the dispatcher module 6026 dispatches the TCP packet that is from the client 6012 to the data processing thread, reports, by using the IP module 6025, the TCP packet to the TCP module 6023 for processing, and notifies the APP module 6021 of a result of the processing.

It should be noted that only two clients are shown in FIG. 6, but persons skilled in the art may understand that a quantity of clients may be greater than a quantity of the clients shown in FIG. 6; and likewise, a quantity of TCP connections may be greater than a quantity of the TCP connections shown in FIG. 6.

It can be learned that when there are a large quantity of TCP connections, the network server may perform adaptive processing on a network packet according to a status of the TCP connection, so that the unsteady TCP connection and the steady TCP connection do not affect each other. In addition, the network server may process in parallel a TCP packet of the unsteady TCP connection and a TCP packet of the steady TCP connection, so as to improve TCP connection processing efficiency of the network server.

Figure 7:
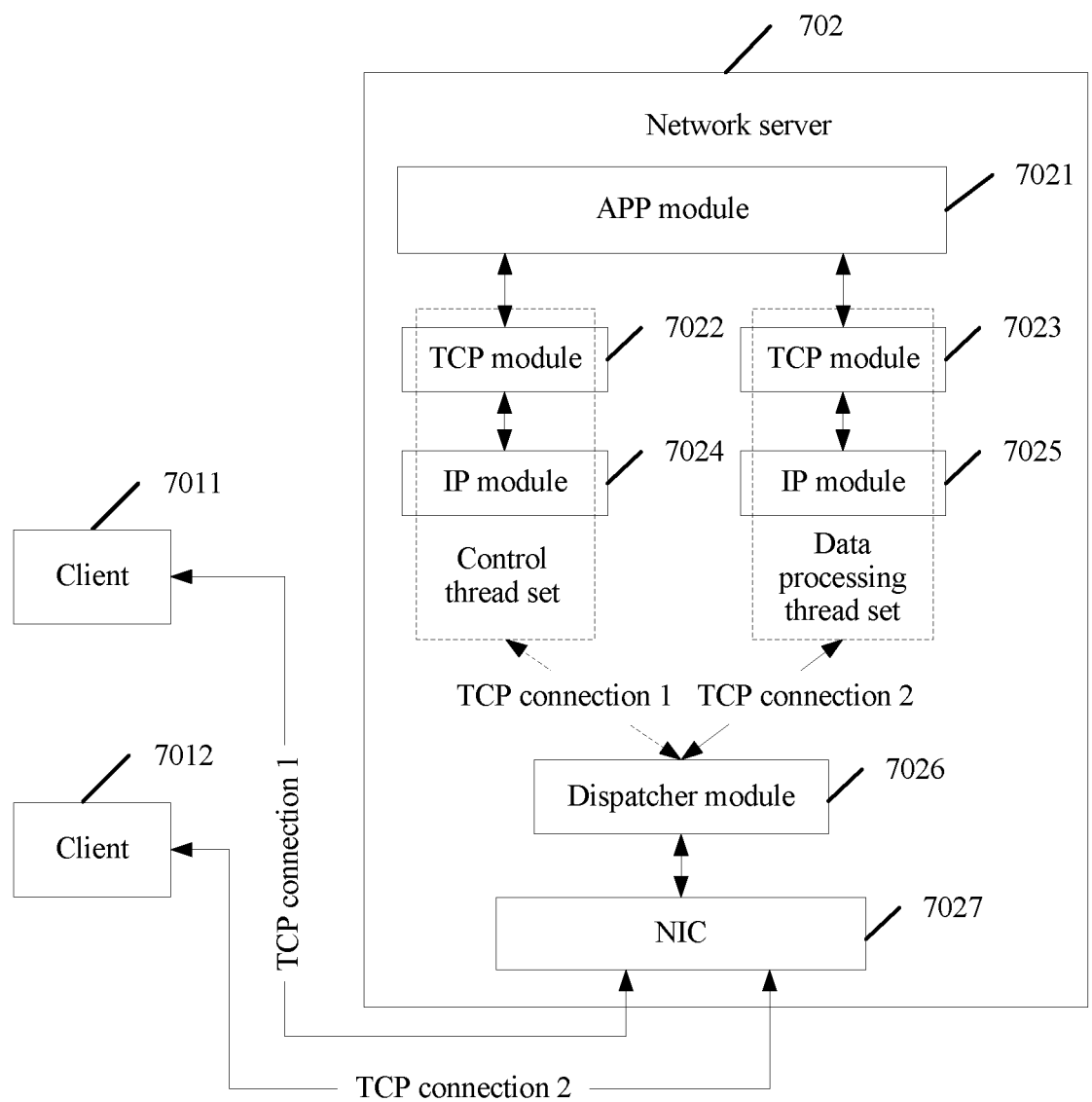
FIG. 7 is another schematic diagram of interaction between a client and a network server disclosed in an embodiment of the present invention.

Referring to FIG. 7, FIG. 7 is another schematic diagram of interaction between a client and a network server disclosed in an embodiment of the present invention. As shown in FIG. 7, a client 7011, a client 7012, and a network server 702 are included. The network server 702 includes an APP module 7021, a TCP module 7022, a TCP module 7023, an IP module 7024, an IP module 7025, a dispatcher module 7026, and an NIC module 7027. Both a function implemented by each module and interaction between modules in FIG. 7 are the same as those in FIG. 6, and a difference lies in that the network server in FIG. 7 may form a set including threads that process a same TCP connection status, for example, a control thread set or a data processing thread set.

The control thread set includes multiple control threads, and each control thread in the control thread set is used to process an unsteady TCP connection. The data processing thread set includes multiple data processing threads, and each data processing thread in the data processing thread set is used to process the steady TCP connection. When establishing a mapping relationship between a quintuple and a control thread, the network server may select, according to a preset rule, a target control thread from the control thread set to establish the mapping relationship. Likewise, when establishing a mapping relationship between a quintuple and a data processing thread, the network server may select, according to a preset rule, a target data processing thread from the data processing thread set to establish the mapping relationship. The preset rule may be a minimum load (for example, a CPU usage or a memory usage) rule.

In addition, different ratios of a quantity of control threads included in the control thread set to a quantity of data processing threads included in the data processing thread set may be set according to different application scenarios. For example, transmission of user data needs to be preferentially processed in an application, and when a TCP protocol stack is initialized, a larger quantity of data processing threads that are responsible for processing the steady TCP connection may be configured in the data processing thread set. For another example, a new connection access capability needs to be preferentially processed in an application, and when a TCP protocol stack is initialized, a larger quantity of control threads that are responsible for processing the unsteady TCP connection may be configured in the control thread set.

In addition, the quantity of control threads and the quantity of data processing threads may be further dynamically configured according to packet traffic. For example, during a period of time, if the network server needs to process a large amount of TCP connection access, and a larger quantity of control threads that are responsible for processing the unsteady TCP connection may be configured in the control thread set; or if the network server needs to process a large amount of user data, a larger quantity of data processing threads that are responsible for processing the steady TCP connection may be configured in the data processing thread set.

It can be learned that in this optional implementation, the network server may set, according to different requirements of a user, the quantity of control threads included in the control thread set and the quantity of data processing threads included in the data processing thread set; and in addition, when a mapping relationship is established, the target control thread or the target data processing thread may be selected according to a preset rule. In a system that supports a parallel CPU computing capability, the TCP protocol stack may effectively use a CPU resource, and may support a higher TCP connection concurrent capability, a more efficient TCP connection processing capability, and a more efficient user packet processing capability.

Figure 8:
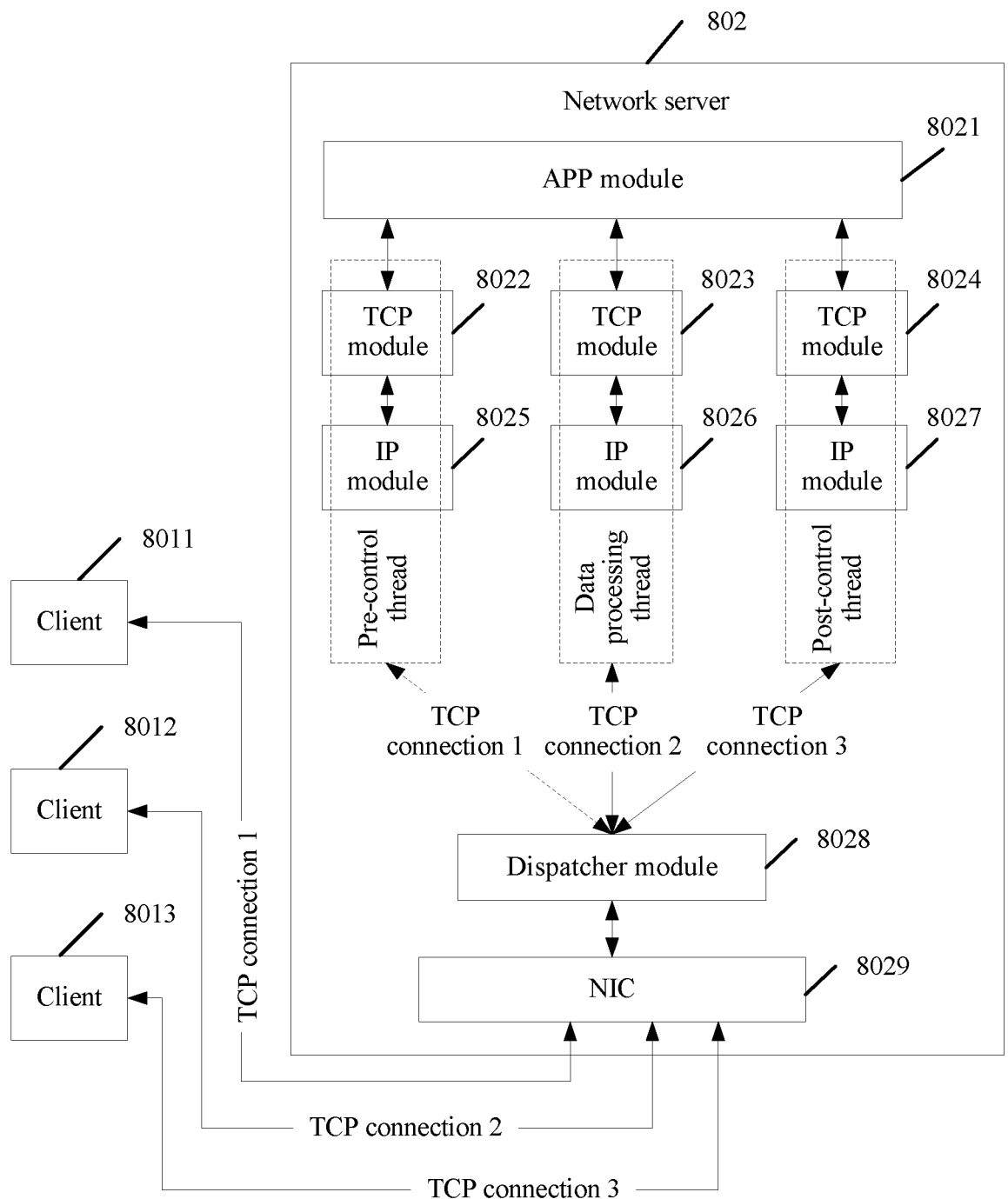
FIG. 8 is another schematic diagram of interaction between a client and a network server disclosed in an embodiment of the present invention.

Referring to FIG. 8, FIG. 8 is another schematic diagram of interaction between a client and a network server disclosed in an embodiment of the present invention. As shown in FIG. 8, a client 8011, a client 8012, a client 8013, and a network server 802 are included. The network server 802 includes an APP module 8021, a TCP module 8022, a TCP module 8023, a TCP module 8024, an IP module 8025, an IP module 8026, an IP module 8027, a dispatcher module 8028, and an NIC module 8029. Both a function implemented by each module and interaction between modules in FIG. 8 are the same those in FIG. 6, and a difference lies in that the network server in FIG. 8 may divide control threads in a system into a pre-control thread and a post-control thread.

TCP connection statuses (an unsteady TCP connection and a steady TCP connection) may be further divided into three statuses: a pre-steady TCP connection, a steady TCP connection, and a post-steady TCP connection. The pre-steady TCP connection refers to all connection statuses whose statuses change before the TCP connection is successfully established, that is, a TCP connection in an establishment process. The steady TCP connection is a TCP connection in a data transmission processing. The post-steady TCP connection refers to other statuses after a TCP connection status changes from the steady TCP connection, that is, a TCP connection in a disconnection process. The pre-control thread is used to process an establishment process of the TCP connection in an unsteady TCP connection state, and the post-control thread is used to process a disconnection process of the TCP connection in an unsteady TCP connection state.

In this way, thread division in the system is more refined, so that the system supports a higher TCP connection concurrent capability and a more efficient TCP packet processing capability.

Figure 9:
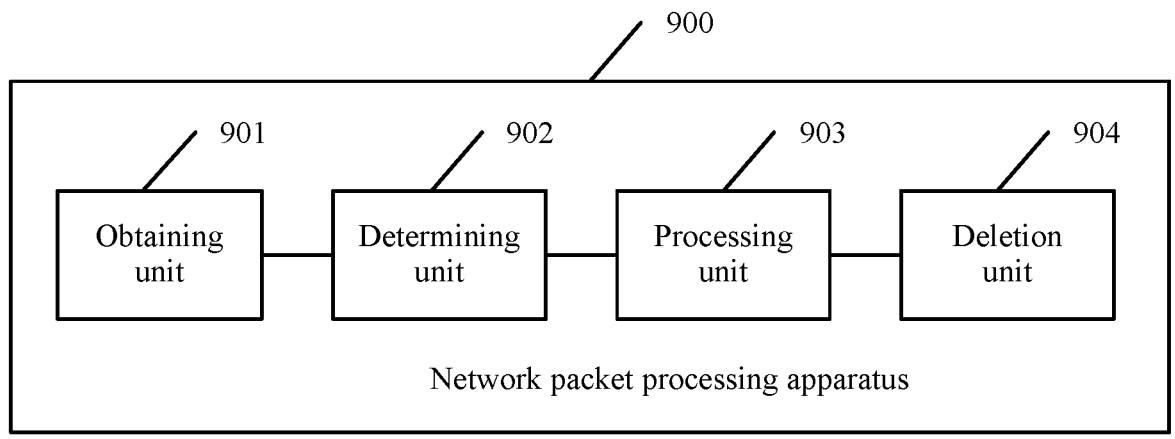
FIG. 9 is a schematic structural diagram of another network packet processing apparatus disclosed in an embodiment of the present invention.

Referring to FIG. 9, FIG. 9 is a schematic structural diagram of another network packet processing apparatus disclosed in an embodiment of the present invention. The network packet processing apparatus is configured to perform some or all steps in the network packet processing method described in FIG. 4. For details, refer to related description of FIG. 4. Details are not described herein again. As shown in FIG. 9, the network packet processing apparatus 900 may include: an obtaining unit 901, a determining unit 902, and a processing unit 903.

The obtaining unit 901 is configured to obtain a TCP connection close request from an application program APP, where the TCP connection close request includes a target socket identifier, and the TCP connection close request is used to request to disconnect a TCP connection identified by the target socket identifier.

The determining unit 902 is configured to determine, according to the target socket identifier, a first thread that processes the TCP connection close request, where a TCP connection status of the TCP connection is an unsteady TCP connection or a steady TCP connection, the unsteady TCP connection represents a TCP connection in an establishment process or a disconnection process, the steady TCP connection represents a TCP connection in a data transmission process, the first thread is a data processing thread, and the data processing thread is used to process the steady TCP connection.

A manner in which the determining unit 902 determines, according to the target socket identifier, the first thread that processes the TCP connection close request may specifically include:

determining, according to a current mapping relationship between the target socket identifier and a thread, a first thread corresponding to the target socket identifier under the current mapping relationship, where a mapping relationship between the target socket identifier and the thread changes when the TCP connection status of the TCP connection identified by the target socket identifier changes.

The processing unit 903 is configured to process the TCP connection close request by using the first thread.

In an optional implementation, after the processing unit 903 processes the TCP connection close request by using the first thread, the TCP connection status of the TCP connection changes from the steady TCP connection to the unsteady TCP connection, and the network packet processing apparatus 900 shown in FIG. 9 may further include:

a deletion unit 904, configured to delete a mapping relationship between the target socket identifier and the first thread.

In the network packet processing apparatus 900 described in FIG. 9, the determining unit 902 may determine, according to the current mapping relationship between the target socket identifier and a thread, the first thread corresponding to the target socket identifier under the current mapping relationship, and the processing unit 903 processes the TCP connection close request from the APP by using the first thread, where the first thread is the data processing thread, and the data processing thread is used to process the steady TCP connection. Therefore, an impact on data transmission caused by disconnection of massive TCP connections may be avoided.

Figure 10:
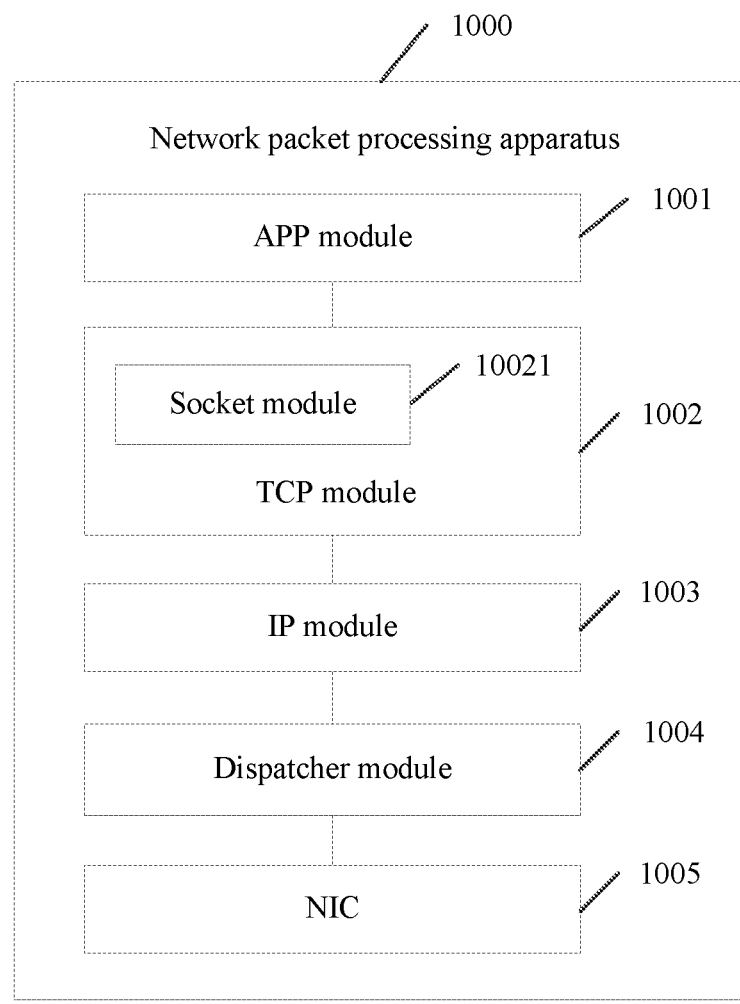
FIG. 10 is a schematic structural diagram of another network packet processing apparatus disclosed in an embodiment of the present invention.

Referring to FIG. 10, FIG. 10 is a schematic structural diagram of another network packet processing apparatus disclosed in an embodiment of the present invention. As shown in FIG. 10, the network packet processing apparatus 1000 may include an APP module 1001, a TCP module 1002, an IP module 1003, a dispatcher module 1004, and an NIC 1005, where the TCP module 1002 includes a socket module 10021.

For details about a function implemented by each module, refer to description in FIG. 1.1. Details are not described herein again.

The network packet processing apparatus may be configured to perform some or all steps in the network packet processing methods described in FIG. 2 to FIG. 4. For details, refer to related descriptions of FIG. 2 to FIG. 4. Details are not described herein again.

Figure 11:
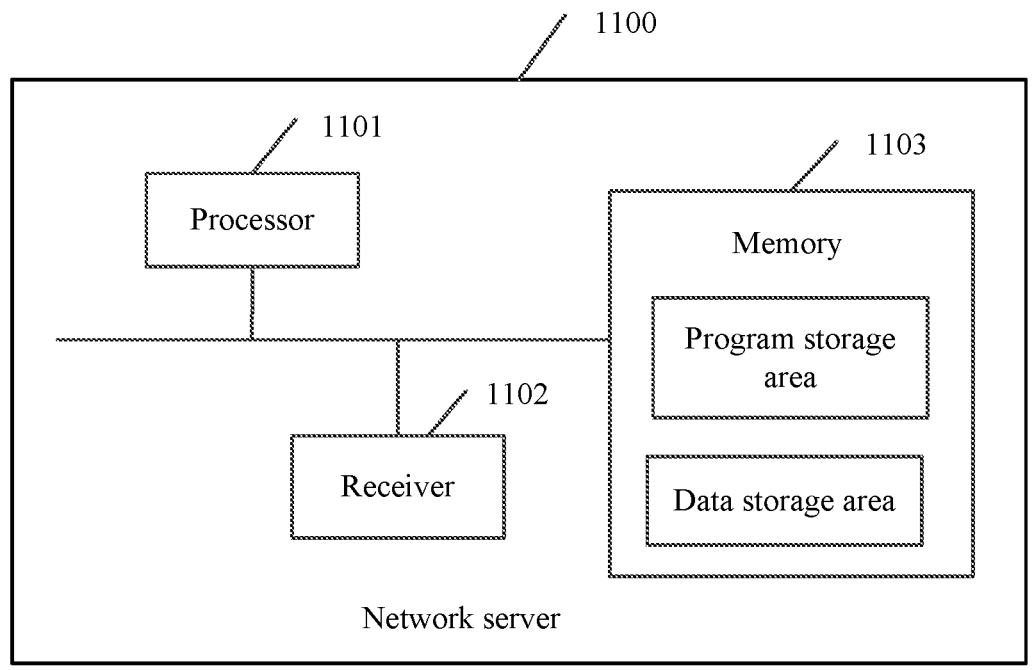
FIG. 11 is a schematic structural diagram of a network server disclosed in an embodiment of the present invention.

Referring to FIG. 11, FIG. 11 is a schematic structural diagram of a network server disclosed in an embodiment of the present invention. The network server is configured to perform some or all steps in the network packet processing method described in FIG. 2 or FIG. 3A and FIG. 3B. For details, refer to description of FIG. 2 or FIG. 3A and FIG. 3B. Details are not described herein again. As shown in FIG. 11, the network server 1100 includes a processor 1101, a receiver 1102, and a memory 1103. The processor 1101, the receiver 1102, and the memory 1103 are separately connected to a communications bus. The memory 1103 may be a high-speed RAM memory, or may be a non-volatile memory (non-volatile memory). The receiver 1102 may be a receiver having a function of receiving information from a peer end, such as an antenna. Persons skilled in the art may understand that a structure of the network server 1100 shown in FIG. 11 does not constitute a limitation on the present invention. The structure may be not only a bus structure but also a star structure, and may further include more or fewer components than those shown in FIG. 11, or combine some parts, or have different parts arrangements.

The processor 1101 is a control center of the network server 1100, and may be a central processing unit (Central Processing Unit, CPU). The processor 1101 is connected to all parts of the entire network server 1100 by using various interfaces and lines, and runs or executes a software program and/or a module that are/is stored in the memory 1103 and calls program code stored in the memory 1103, to perform the following operations:

receiving, by the receiver 1102, a first Transmission Control Protocol TCP packet sent by a client, where the first TCP packet includes a first quintuple;

determining, according to the first quintuple, a first thread that processes the first TCP packet, where the first quintuple is used to identify a TCP connection corresponding to the first TCP packet, a TCP connection status of the TCP connection is an unsteady TCP connection or a steady TCP connection, the unsteady TCP connection represents a TCP connection in an establishment process or a disconnection process, the steady TCP connection represents a TCP connection in a data transmission process, the first thread is a control thread or a data processing thread, the control thread is used to process the unsteady TCP connection, and the data processing thread is used to process the steady TCP connection; and processing the first TCP packet by using the first thread.

In an optional implementation, a manner in which the processor 1101 determines, according to the first quintuple, the first thread that processes the first TCP packet specifically includes:

determining, according to a current mapping relationship between the first quintuple and a thread, a first thread corresponding to the first quintuple under the current mapping relationship, where a mapping relationship between the first quintuple and the thread changes when the TCP connection status of the TCP connection changes.

Optionally, the control thread is a pre-control thread or a post-control thread, the pre-control thread is used to process an establishment process of the TCP connection in an unsteady TCP connection state, and the post-control thread is used to process a disconnection process of the TCP connection in an unsteady TCP connection state.

In an optional implementation, the first thread is the control thread, and after the processor processes the first TCP packet by using the first thread, the TCP connection status of the TCP connection changes from the unsteady TCP connection to the steady TCP connection, and the processor 1101 is further configured to call the program code stored in the memory 1103 to perform the following steps:

deleting a mapping relationship between the first quintuple and the first thread; and re-establishing a mapping relationship between the first quintuple and a thread, so that a thread corresponding to the first quintuple changes to a second thread, where the second thread is the data processing thread.

In another optional implementation, the processor 1101 is further configured to call the program code stored in the memory 1103 to perform the following steps:

receiving, by the receiver 1102, a second TCP packet sent by the client, where the second TCP packet includes the first quintuple;

determining, according to the re-established mapping relationship between the first quintuple and a thread, the thread corresponding to the first quintuple as the second thread; and processing the second TCP packet by using the second thread.

In another optional implementation, the first thread is the data processing thread, and after the processor processes the first TCP packet by using the first thread, the TCP connection status of the TCP connection changes from the steady TCP connection to the unsteady TCP connection, and the processor 1101 is further configured to call the program code stored in the memory 1103 to perform the following steps:

deleting a mapping relationship between the first quintuple and the first thread; and re-establishing a mapping relationship between the first quintuple and a thread, so that a thread corresponding to the first quintuple changes to a third thread, where the third thread is the control thread.

In another optional implementation, the processor 1101 is further configured to call the program code stored in the memory 1103 to perform the following steps:

receiving, by the receiver 1102, a third TCP packet sent by the client, where the third TCP packet includes the first quintuple;

determining, according to the re-established mapping relationship between the first quintuple and a thread, the thread corresponding to the first quintuple as the third thread; and processing the third TCP packet by using the third thread.

In the network server described in FIG. 11, after the network server receives the first TCP packet, the network server may determine, according to the first quintuple, the first thread that processes the first TCP packet. If the first thread is the control thread, the network server may process the first TCP packet by using the control thread; or if the first thread is the data processing thread, the network server may process the first TCP packet by using the data processing thread. Therefore, adaptive processing may be performed on a network packet according to the status of the TCP connection.

In addition, for each TCP connection, the network server may process a TCP packet of the TCP connection according to the foregoing steps. When there are a large quantity of TCP connections, the network server performs adaptive processing on the network packet according to the status of the TCP connection, so that the unsteady TCP connection and the steady TCP connection do not affect each other. In addition, the network server may process in parallel a TCP packet of the unsteady TCP connection and a TCP packet of the steady TCP connection, so as to improve TCP connection processing efficiency of the network server.

Figure 12:
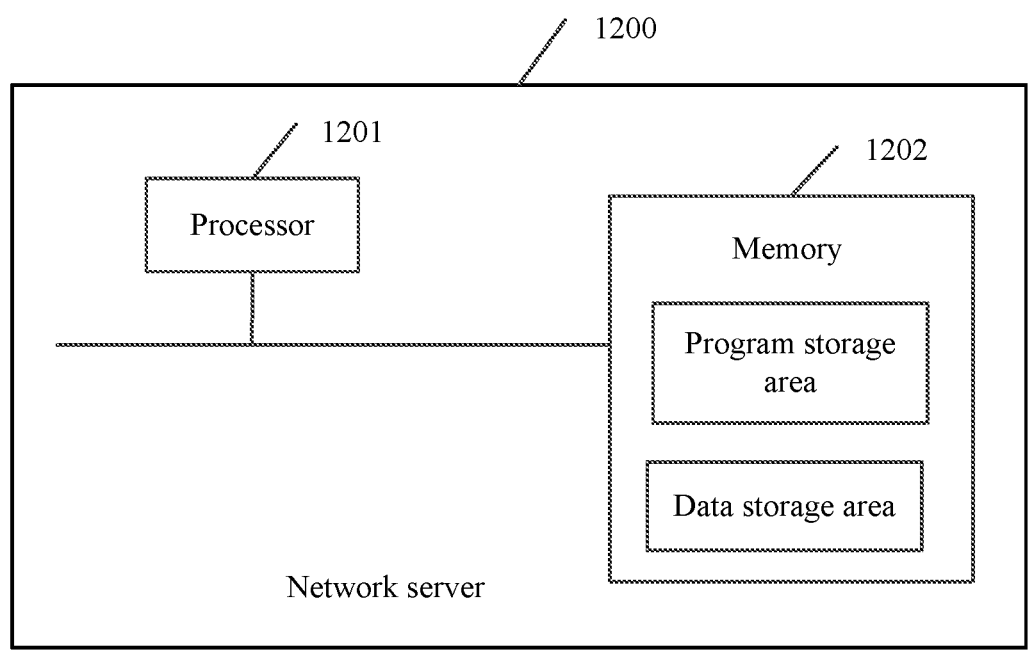
FIG. 12 is a schematic structural diagram of another network server disclosed in an embodiment of the present invention.

Referring to FIG. 12, FIG. 12 is a schematic structural diagram of another network server disclosed in an embodiment of the present invention. The network server is configured to perform some or all steps in the network packet processing method described in FIG. 4. For details, refer to description in FIG. 4. Details are not described herein again. As shown in FIG. 12, the network server 1200 includes a processor 1201 and a memory 1202. The processor 1201 and the memory 1202 are separately connected to a communications bus. The memory 1202 may be a high-speed RAM memory, or may be a non-volatile memory (non-volatile memory). Persons skilled in the art may understand that a structure of the network server 1200 shown in FIG. 12 does not constitute a limitation on the present invention. The structure may be not only a bus structure but also a star structure, and may further include more or fewer components than those shown in FIG. 12, or combine some parts, or have different parts arrangements.

The processor 1201 is a control center of the network server 1200, and may be a central processing unit (Central Processing Unit, CPU). The processor 1201 is connected to all parts of the entire network server 1200 by using various interfaces and lines, and runs or executes a software program and/or a module that are/is stored in the memory 1202 and calls program code stored in the memory 1202, to perform the following operations:

obtaining a TCP connection close request from an application program APP, where the TCP connection close request includes a target socket identifier, and the TCP connection close request is used to request to disconnect a TCP connection identified by the target socket identifier;

determining, according to the target socket identifier, a first thread that processes the TCP connection close request, where a TCP connection status of the TCP connection is an unsteady TCP connection or a steady TCP connection, the unsteady TCP connection represents a TCP connection in an establishment process or a disconnection process, the steady TCP connection represents a TCP connection in a data transmission process, the first thread is a data processing thread, and the data processing thread is used to process the steady TCP connection;

and processing the TCP connection close request by using the first thread.

In an optional implementation, a manner in which the processor 1201 determines, according to the target socket identifier, the first thread that processes the TCP connection close request specifically includes:

determining, according to a current mapping relationship between the target socket identifier and a thread, a first thread corresponding to the target socket identifier under the current mapping relationship, where a mapping relationship between the target socket identifier and the thread changes when the TCP connection status of the TCP connection identified by the target socket identifier changes.

In an optional implementation, after the processor 1201 processes the TCP connection close request by using the first thread, the TCP connection status of the TCP connection changes from the steady TCP connection to the unsteady TCP connection, and the processor 1201 is further configured to call the program code stored in the memory 1202 to perform the following step:

deleting a mapping relationship between the target socket identifier and the first thread.

In the network server descried in FIG. 12, the network server may determine, according to the target socket identifier, the first thread that processes the TCP connection close request, and process the TCP connection close request by using the first thread. The first thread is the data processing thread, and the data processing thread is used to process the steady TCP connection. Therefore, an impact on data transmission caused by disconnection of massive TCP connections may be avoided.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all are examples of embodiments, and the involved actions and units are not necessarily required by this application.

In the foregoing embodiments, the description of each embodiment has respective focuses. For a part that is not described in detail in an embodiment, reference may be made to related descriptions in other embodiments.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A network packet processing method, comprising:
   receiving a first Transmission Control Protocol (TCP) packet sent by a client, wherein the first TCP packet comprises a first quintuple;
   determining, according to the first quintuple, a first thread that processes the first TCP packet, wherein the first quintuple is used to identify a TCP connection corresponding to the first TCP packet, wherein:
   a TCP connection status of the TCP connection is an unsteady TCP connection or a steady TCP connection, wherein the unsteady TCP connection represents a TCP connection in an establishment process or a disconnection process, and the steady TCP connection represents a TCP connection in a data transmission process;
   the first thread is a control thread or a data processing thread, wherein the control thread is used to process the unsteady TCP connection, and the data processing thread is used to process the steady TCP connection; and
   determining the first thread comprises:
   in response to determining that the TCP connection is the unsteady TCP connection, determining the control thread as the first thread; or
   in response to determining that the TCP connection is the steady TCP connection, determining the data processing thread as the first thread; and
   processing the first TCP packet by using the first thread.

2. The method according to claim 1, wherein the determining comprises:
   determining, according to a current mapping relationship between the first quintuple and a thread, the first thread corresponding to the first quintuple under the current mapping relationship, wherein a mapping relationship between the first quintuple and the thread changes when the TCP connection status of the TCP connection changes.

3. The method according to claim 2, wherein the first thread is the control thread, and, after the processing the first TCP packet by using the first thread, the TCP connection status of the TCP connection changes from the unsteady TCP connection to the steady TCP connection, and the method further comprises:
   deleting a mapping relationship between the first quintuple and the first thread; and
   re-establishing a mapping relationship between the first quintuple and a thread, wherein a thread corresponding to the first quintuple changes to a second thread, wherein the second thread is a data processing thread.

4. The method according to claim 3, wherein the method further comprises:
   receiving a second TCP packet sent by the client, wherein the second TCP packet comprises the first quintuple;
   determining, according to the re-established mapping relationship between the first quintuple and a thread, the thread corresponding to the first quintuple as the second thread; and
   processing the second TCP packet by using the second thread.

5. The method according to claim 2, wherein the first thread is the data processing thread, and, after the processing the first TCP packet by using the first thread, the TCP connection status of the TCP connection changes from the steady TCP connection to the unsteady TCP connection, and the method further comprises:
   deleting a mapping relationship between the first quintuple and the first thread; and
   re-establishing a mapping relationship between the first quintuple and a thread, wherein a thread corresponding to the first quintuple changes to a third thread, wherein the third thread is a control thread.

6. The method according to claim 5, wherein the method further comprises:
   receiving a third TCP packet sent by the client, wherein the third TCP packet comprises the first quintuple;
   determining, according to the re-established mapping relationship between the first quintuple and a thread, the thread corresponding to the first quintuple as the third thread; and
   processing the third TCP packet by using the third thread.

7. The method according to claim 1, wherein the control thread is a pre-control thread or a post-control thread, the pre-control thread is used to process an establishment process of the TCP connection in an unsteady TCP connection state, and the post-control thread is used to process a disconnection process of the TCP connection in an unsteady TCP connection state.

8. A network server, comprising: at least one processor, at least one receiver, and one or more memories, wherein the at least one processor, the at least one receiver, and the one or more memories are connected to a communications bus, wherein the one or more memories store programming instructions for execution by the at least one processor to:
   receive, by the receiver, a first Transmission Control Protocol (TCP) packet sent by a client, wherein the first TCP packet comprises a first quintuple;
   determine, by the at least one processor, according to the first quintuple, a first thread that processes the first TCP packet, wherein the first quintuple is used to identify a TCP connection corresponding to the first TCP packet, wherein:
   a TCP connection status of the TCP connection is an unsteady TCP connection or a steady TCP connection, the unsteady TCP connection represents a TCP connection in an establishment process or a disconnection process, and the steady TCP connection represents a TCP connection in a data transmission process;
   the first thread is a control thread or a data processing thread, the control thread is used to process the unsteady TCP connection, and the data processing thread is used to process the steady TCP connection; and determining the first thread comprises:
in response to determining that the TCP connection is the unsteady TCP connection, determining the control thread as the first thread; or
in response to determining that the TCP connection is the steady TCP connection, determining the data processing thread as the first thread; and
process, by the at least one processor, the first TCP packet by using the first thread.

9. The network server according to claim 8, wherein determining, according to the first quintuple, the first thread that processes the first TCP packet comprises:
determining, according to a current mapping relationship between the first quintuple and a thread, the first thread corresponding to the first quintuple under the current mapping relationship, wherein a mapping relationship between the first quintuple and the thread changes when the TCP connection status of the TCP connection changes.

10. The network server according to claim 8, wherein the first thread is the control thread, and, after the at least one processor processes the first TCP packet by using the first thread, the TCP connection status of the TCP connection changes from the unsteady TCP connection to the steady TCP connection, and the one or more memories store programming instructions for execution by the at least one processor to:
delete a mapping relationship between the first quintuple and the first thread; and
re-establish a mapping relationship between the first quintuple and a thread, wherein a thread corresponding to the first quintuple changes to a second thread, wherein the second thread is a data processing thread.

11. The network server according to claim 10, wherein the one or more memories store programming instructions for execution by the at least one processor to:
receive a second TCP packet sent by the client, wherein the second TCP packet comprises the first quintuple;
determine, according to the re-established mapping relationship between the first quintuple and a thread, the thread corresponding to the first quintuple as the second thread; and
process the second TCP packet by using the second thread.

12. The network server according to claim 8, wherein the first thread is the data processing thread, and, after the at least one processor processes the first TCP packet by using the first thread, the TCP connection status of the TCP connection changes from the steady TCP connection to the unsteady TCP connection, and the one or more memories store programming instructions for execution by the at least one processor to:
delete a mapping relationship between the first quintuple and the first thread; and
re-establish a mapping relationship between the first quintuple and a thread, wherein a thread corresponding to the first quintuple changes to a third thread, wherein the third thread is a control thread.

13. The network server according to claim 12, wherein the one or more memories store programming instructions for execution by the at least one processor to:
receive a third TCP packet sent by the client, wherein the third TCP packet comprises the first quintuple;
determine, according to the re-established mapping relationship between the first quintuple and a thread, the thread corresponding to the first quintuple as the third thread; and
process the third TCP packet by using the third thread.

14. A non-transitory computer-readable medium storing computer instructions for network packet processing, that when executed by one or more processors, cause the one or more processors to:
receive a first Transmission Control Protocol (TCP) packet sent by a client, wherein the first TCP packet comprises a first quintuple;
determine, according to the first quintuple, a first thread that processes the first TCP packet, wherein the first quintuple is used to identify a TCP connection corresponding to the first TCP packet, wherein:
a TCP connection status of the TCP connection is an unsteady TCP connection or a steady TCP connection, wherein the unsteady TCP connection represents a TCP connection in an establishment process or a disconnection process, the steady TCP connection represents a TCP connection in a data transmission process;
the first thread is a control thread or a data processing thread, wherein the control thread is used to process the unsteady TCP connection, and the data processing thread is used to process the steady TCP connection; and
determining the first thread comprises:
in response to determining that the TCP connection is the unsteady TCP connection, determining the control thread as the first thread; or
in response to determining that the TCP connection is the steady TCP connection, determining the data processing thread as the first thread; and
process the first TCP packet by using the first thread.

15. The non-transitory computer-readable medium according to claim 14, wherein the computer instructions, when executed by one or more processors, cause the one or more processors to:
determining, according to a current mapping relationship between the first quintuple and a thread, a first thread corresponding to the first quintuple under the current mapping relationship, wherein a mapping relationship between the first quintuple and the thread changes when the TCP connection status of the TCP connection changes.

16. The non-transitory computer-readable medium according to claim 15, wherein the first thread is the control thread, and, after the processing the first TCP packet by using the first thread, the TCP connection status of the TCP connection changes from the unsteady TCP connection to the steady TCP connection, and wherein the computer instructions, when executed by one or more processors, cause the one or more processors to:
delete the mapping relationship between the first quintuple and the first thread; and
re-establish a mapping relationship between the first quintuple and a thread, wherein a thread corresponding to the first quintuple changes to a second thread, wherein the second thread is a data processing thread.

17. The non-transitory computer-readable medium according to claim 16, wherein the computer instructions, when executed by one or more processors, cause the one or more processors to:
receive a second TCP packet sent by the client, wherein the second TCP packet comprises the first quintuple;
determine, according to the re-established mapping relationship between the first quintuple and a thread, the thread corresponding to the first quintuple as the second thread; and
process the second TCP packet by using the second thread.

18. The non-transitory computer-readable medium according to claim 14, wherein the first thread is the data processing thread, and, after the processing the first TCP packet by using the first thread, the TCP connection status of the TCP connection changes from the steady TCP connection to the unsteady TCP connection, and wherein the computer instructions, when executed by one or more processors, cause the one or more processors to:
delete a mapping relationship between the first quintuple and the first thread; and
re-establish a mapping relationship between the first quintuple and a thread, wherein a thread corresponding to the first quintuple changes to a third thread, wherein the third thread is a control thread.

19. The non-transitory computer-readable medium according to claim 18, wherein the computer instructions, when executed by one or more processors, cause the one or more processors to :
receive a third TCP packet sent by the client, wherein the third TCP packet comprises the first quintuple;
determine, according to the re-established mapping relationship between the first quintuple and a thread, the thread corresponding to the first quintuple as the third thread; and
process the third TCP packet by using the third thread.

20. The non-transitory computer-readable medium according to claim 14, wherein the control thread is a pre-control thread or a post-control thread, the pre-control thread is used to process an establishment process of the TCP connection in an unsteady TCP connection state, and the post-control thread is used to process a disconnection process of the TCP connection in an unsteady TCP connection state.

* * * * *